(12) United States Patent
Fukuoka et al.

(10) Patent No.: US 10,301,186 B2
(45) Date of Patent: May 28, 2019

(54) COMPLEXES OF CALCIUM CARBONATE MICROPARTICLES AND FIBERS AS WELL AS PROCESSES FOR PREPARING THEM

(71) Applicant: NIPPON PAPER INDUSTRIES CO., LTD., Tokyo (JP)

(72) Inventors: Moe Fukuoka, Tokyo (JP); Toru Nakatani, Tokyo (JP); Shisei Goto, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 15/300,461

(22) PCT Filed: Mar. 31, 2015

(86) PCT No.: PCT/JP2015/060234
§ 371 (c)(1),
(2) Date: Sep. 29, 2016

(87) PCT Pub. No.: WO2015/152283
PCT Pub. Date: Oct. 8, 2015

(65) Prior Publication Data
US 2017/0107668 A1  Apr. 20, 2017

(30) Foreign Application Priority Data

Mar. 31, 2014 (JP) .................................. 2014-071680
Mar. 31, 2014 (JP) .................................. 2014-073570
Mar. 31, 2014 (JP) .................................. 2014-073629

(51) Int. Cl.
*D21H 17/67* (2006.01)
*D21H 19/38* (2006.01)
(Continued)

(52) U.S. Cl.
CPC ........... *C01F 11/181* (2013.01); *B01J 19/008* (2013.01); *C08K 3/26* (2013.01); *C08L 23/12* (2013.01);
(Continued)

(58) Field of Classification Search
CPC .... D21H 17/675; D21H 17/70; D21H 19/385; D21H 11/18; D21H 23/04;
(Continued)

(56) References Cited

U.S. PATENT DOCUMENTS 2,927,693 A * 3/1960 Boadway ................ B04C 5/081
 209/728
3,443,890 A * 5/1969 Myers .................... B82Y 30/00
 106/465

(Continued)

FOREIGN PATENT DOCUMENTS

CA 2943930 A1 * 10/2015 ........... D21H 19/385
CA 2944320 A1 * 10/2015 ........... D21H 19/385
(Continued)

OTHER PUBLICATIONS

Fortuna et al/, "Obtaining and Utilizing Cellulose Fibers with in-Situ Loading as an Additive for Printing Paper," Materials,2013, 6 pp. 4532-4544 (Year: 2013).*
(Continued)

*Primary Examiner* — Jose A Fortuna
(74) *Attorney, Agent, or Firm* — McCarter & English, LLP; Steven G. Davis; Wei Song

(57) ABSTRACT

The present invention aims to provide techniques for preparing complexes of calcium carbonate particles having an average primary particle size of less than 1 μm and a fiber. Complexes of calcium carbonate microparticles having an average primary particle size of less than 1 μm and a fiber (Continued)

can be synthesized efficiently by synthesizing calcium carbonate in a solution bearing the fiber while injecting a liquid into a reaction vessel.

13 Claims, 11 Drawing Sheets

(51) Int. Cl.
    *C08K 3/26* (2006.01)
    *C01F 11/18* (2006.01)
    *C08L 23/12* (2006.01)
    *C09C 1/02* (2006.01)
    *B01J 19/00* (2006.01)

(52) U.S. Cl.
    CPC ........... *C09C 1/021* (2013.01); *D21H 17/675* (2013.01); *D21H 19/385* (2013.01); *C01P 2004/03* (2013.01); *C01P 2004/61* (2013.01); *C01P 2004/62* (2013.01); *C01P 2004/64* (2013.01); *C01P 2006/12* (2013.01); *C01P 2006/19* (2013.01); *C08K 2003/265* (2013.01); *C08L 2205/16* (2013.01)

(58) Field of Classification Search
    CPC .............. C01P 2004/61; C01P 2004/62; C01P 2004/64; C01F 11/181; C01F 11/182; C08K 3/26; C09C 1/021; C08L 2205/16; D21C 9/004; Y10T 428/25; B82Y 30/00; D06M 11/76
    See application file for complete search history.

(56) References Cited

U.S. PATENT DOCUMENTS

| | | | | |
|---|---|---|---|---|
| 5,075,093 A * | 12/1991 | Tanaka | .................. | C01F 11/181 106/464 |
| 5,665,205 A | 9/1997 | Srivatsa et al. | | |
| 5,679,220 A | 10/1997 | Matthew et al. | | |
| 5,731,080 A | 3/1998 | Cousin et al. | | |
| 5,811,070 A | 9/1998 | You | | |
| 5,824,364 A * | 10/1998 | Cousin | .................. | D21H 11/18 427/206 |
| 6,235,150 B1 * | 5/2001 | Middleton | .............. | D21C 9/002 162/164.1 |
| 6,540,878 B1 | 4/2003 | Leino | | |
| 6,659,636 B1 * | 12/2003 | Matula | .................. | B01F 3/0865 366/165.1 |
| 7,234,857 B2 * | 6/2007 | Matula | .................. | B01F 3/0865 366/167.1 |
| 8,329,289 B2 * | 12/2012 | Buri | ........................ | B82Y 30/00 428/323 |
| 8,349,939 B2 * | 1/2013 | Buri | ........................ | B82Y 30/00 428/323 |
| 8,926,793 B2 * | 1/2015 | Goto | ........................ | D21D 5/02 162/147 |
| 9,051,689 B2 * | 6/2015 | Solismaa | ................ | C01F 11/18 |
| 9,562,328 B2 * | 2/2017 | Axrup | ...................... | C08K 3/26 |
| 2003/0000665 A1 * | 1/2003 | Takai | ...................... | D21H 5/005 162/115 |
| 2004/0108081 A1 * | 6/2004 | Hughes | .................. | D21H 11/16 162/9 |
| 2004/0108082 A1 * | 6/2004 | Hughes | ................ | C01F 11/181 162/9 |
| 2006/0292056 A1 * | 12/2006 | Lin | ........................ | B01F 5/102 423/430 |
| 2007/0029185 A1 | 2/2007 | Tung | | |
| 2007/0169905 A1 | 7/2007 | Yamashita et al. | | |
| 2009/0022912 A1 * | 1/2009 | Kaessberger | ........ | B41M 5/5218 428/32.34 |
| 2009/0162638 A1 * | 6/2009 | Buri | ........................ | B82Y 30/00 428/323 |
| 2010/0331457 A1 * | 12/2010 | Buri | ........................ | C09C 1/021 524/13 |
| 2011/0000633 A1 * | 1/2011 | Kukkamaki | .......... | C01F 11/181 162/181.2 |
| 2011/0226428 A1 * | 9/2011 | Goto | ...................... | B21D 1/325 162/37 |
| 2012/0252933 A1 * | 10/2012 | Gane | ......................... | C09C 1/02 523/457 |
| 2013/0036948 A1 * | 2/2013 | Fernandez | ............ | C01F 11/182 106/725 |
| 2013/0126116 A1 * | 5/2013 | Solismaa | ................ | C01F 11/18 162/181.2 |
| 2013/0312925 A1 * | 11/2013 | Saastamoinen | ........ | D21H 17/28 162/175 |
| 2014/0216673 A1 * | 8/2014 | Chin | ...................... | D21H 17/25 162/177 |
| 2015/0299959 A1 * | 10/2015 | Axrup | ...................... | C08K 3/26 162/181.4 |
| 2015/0315748 A1 * | 11/2015 | Imppola | .................. | D21H 11/18 162/157.7 |
| 2016/0032530 A1 * | 2/2016 | Virtanen | ................ | D21H 17/63 162/164.6 |
| 2017/0107668 A1 * | 4/2017 | Fukuoka | .............. | D21H 17/675 |
| 2017/0113945 A1 * | 4/2017 | Fukuoka | .............. | C01F 11/181 |
| 2017/0204270 A1 * | 7/2017 | Mathur | .................. | C09C 1/0093 |
| 2017/0283619 A1 * | 10/2017 | Pohl | ........................ | C09C 1/022 |
| 2017/0306057 A1 * | 10/2017 | Windebank | ............. | C08B 16/00 |
| 2017/0306562 A1 * | 10/2017 | Phipps | ..................... | D01D 5/08 |
| 2018/0346333 A1 * | 12/2018 | Fukuoka | ................ | C01B 25/32 |

FOREIGN PATENT DOCUMENTS

| | | | | |
|---|---|---|---|---|
| DE | 102006026965 A1 * | 12/2007 | ............ | B82Y 30/00 |
| EP | 3127868 A1 * | 2/2017 | .......... | D21H 19/385 |
| GB | 2309692 A | 8/1997 | | |
| GB | 2312670 A * | 11/1997 | ........... | C01F 11/182 |
| GB | 2312670 A | 11/1997 | | |
| IN | 201103546 | 8/2013 | | |
| JP | 1072215 A | 3/1998 | | |
| JP | 2003246617 A | 9/2003 | | |
| JP | 2007-528946 A | 10/2007 | | |
| JP | 2007-528947 A | 10/2007 | | |
| JP | 2009-155120 A | 7/2009 | | |
| JP | 2011-73891 A | 4/2011 | | |
| JP | 2011073891 A * | 4/2011 | ............. | D21H 17/70 |
| JP | 2011073892 A | 4/2011 | | |
| JP | 2011-116601 A | 6/2011 | | |
| JP | 2011116601 A * | 6/2011 | ............. | B82Y 30/00 |
| JP | 2013536329 A | 9/2013 | | |
| JP | 2017057515 A * | 3/2017 | | |
| JP | 2017066578 A * | 4/2017 | | |
| WO | WO-9732934 A1 * | 9/1997 | ............. | B82Y 30/00 |
| WO | 2005/005725 A1 | 1/2005 | | |
| WO | 2005/005726 A1 | 1/2005 | | |
| WO | WO-2005005725 A1 * | 1/2005 | ........... | D21H 17/675 |
| WO | WO-2005005726 A1 * | 1/2005 | ............. | D21H 17/70 |
| WO | WO-2009074491 A1 * | 6/2009 | ............. | C09C 1/021 |
| WO | WO-2009081548 A1 * | 7/2009 | ............. | B82Y 30/00 |
| WO | 2011110744 A2 | 9/2011 | | |
| WO | WO-2011110744 A2 * | 9/2011 | ............. | D21H 17/70 |
| WO | WO-2012022836 A1 * | 2/2012 | .............. | C01F 11/18 |
| WO | 2015/152269 A1 | 10/2015 | | |
| WO | 2015/152283 A1 | 10/2015 | | |
| WO | WO-2015152283 A1 * | 10/2015 | .......... | D21H 19/385 |

OTHER PUBLICATIONS

Resalati et al., "Cellulose-precipitated calcium carbonate composites and their effect on paper properties," Chemical Paper, 68 (6), pp. 774-781 (Year: 2014).*

Ciobanu et al., "In-Situ Cellulose Fibres Loading with Calcium Carbonate Precipitated by Different Methods," Cellulose Che,. Technol., 44 (9), pp. 379-387 (Year: 2010).*

Zou et al., in "Microfibrillated Cellulose (MFC) for Papermaking," International Conference on naotechnology for the Forest Products Industry, Georgia Tech. (Year: 2007).*

(56) References Cited

OTHER PUBLICATIONS

Supplementary European Search Report for Application No. 15773957.4, dated Nov. 7, 2017. 6 pages.
European Search Report for Application No. 15774197.6, dated Oct. 26, 2017. 6 pages.
Ahn J-W et al., Synthesis of Ultrafine Calcium Carbonate Powders by Nozzle Spouting Method, Journal of the Korean Ceramic Society, Nov. 30, 1996, vol. 33, No. 11, pp. 1276-1284.
Gang Wang et al., Journal of Materials Science Letters, Jul. 1, 2002, vol. 21, No. 13, pp. 985-986.
Gareth J. Price et al., Composition of Calcium Carbondate Polymorphs precipitated Using Ultrasound, Crystal Growth & Design, 2011, vol. 11, No. 1, pp. 39-44.
ISR of PCT/JP2015/060200, dated Jun. 23, 2015.
ISR of PCT/JP2015/060234, dated Jun. 23, 2015.
Kenichi Harashima et al., Journal of the Japan Society for Abrasive Technology, Jun. 2011, vol. 55, No. 6, pp. 342-345.
Yanmin Wang, et al., Chemical Engineering Comm., Jul. 1, 2005, vol. 192, No. 10-12, pp. 1468-1481.

\* cited by examiner

COMPLEXES OF CALCIUM CARBONATE MICROPARTICLES AND FIBERS AS WELL AS PROCESSES FOR PREPARING THEM

RELATED APPLICATIONS

This application is a U.S. national stage filing, under 35 U.S.C. § 371(c), of International Application No. PCT/JP2015/060234, filed on Mar. 31, 2015, which claims priority to Japanese Patent Application No. 2014-071680, filed on Mar. 31, 2014; Japanese Patent Application No. 2014-073570, filed on Mar. 31, 2014; and Japanese Patent Application No. 2014-073629, filed on Mar. 31, 2014. The entire contents of each of the aforementioned applications are incorporated herein by reference.

TECHNICAL FIELD

The present invention relates to complexes of calcium carbonate microparticles and fibers as well as processes for preparing them. In particular, the present invention relates to complexes comprising calcium carbonate microparticles having an average primary particle size of less than 1 μm adhered to the surface of a fiber and processes for preparing them.

BACKGROUND ART

In general, calcium carbonates are mainly classified into "natural calcium carbonate" prepared from natural limestone, weathered shell or the like by mechanically grinding and classifying it and "synthetic calcium carbonate" (precipitated calcium carbonate) prepared from limestone by chemically reacting it. Known processes for synthesizing the synthetic calcium carbonate include the carbonation process, the lime-soda process, and the Solvay process, among which the lime-soda process and the Solvay process are sometimes employed for special applications while industrial synthesis of calcium carbonate typically involves the carbonation process.

Synthesis of calcium carbonate by the carbonation process involves reacting quick lime and carbonic acid gas, and typically comprises a slaving step in which water is added to quick lime CaO to give slaked lime $Ca(OH)_2$, and a carbonation step in which, carbonic acid gas $CO_2$ is injected into the slaked lime to give calcium carbonate $CaCO_3$. At present, various techniques for controlling the particle shape or particle size or the like of the product calcium carbonate have been proposed by regulating reaction conditions in synthesis steps of calcium carbonate, particularly the carbonation step.

Various techniques for depositing calcium carbonate on fibers such as pulps have also been proposed. JPA 1994-158585 describes complexes comprising crystalline calcium carbonate mechanically bonded on fibers. On the other hand, U.S. Pat. No. 5,679,220 describes a technique for preparing a complex of a pulp and a calcium carbonate by precipitating the calcium carbonate in a suspension of the pulp by the carbonation process. U.S. Pat. No. 5,665,205 describes a technique for improving the brightness and purity of a waste paper fiber by adding a large amount of a filler for papers and paperboards to the fiber, which comprises sending a slurry of a waste paper pulp to a gas-liquid contactor where the pulp is broken by contact with a slurry of an alkali salt in a counter-flow direction in a contact/breaking zone and sending a suitable reactive gas and mixing it with the precipitating filler to deposit the filler on the surface of the fiber.

In addition, JPA 2013-521417 and US Patent Publication No. 2011/0000633 disclose techniques for preparing fiber webs in which calcium carbonate has been incorporated efficiently by depositing calcium carbonate in the step of forming the fiber webs (wet paper).

CITATION LIST

Patent Documents

Patent document 1: JPA 1994-158585
Patent document 2: U.S. Pat. No. 5,679,220
Patent document 3: U.S. Pat. No. 5,665,205
Patent document 4: JPA 2013-521417
Patent document 5: US Patent Publication No. 2011/0000633.

SUMMARY OF INVENTION

Technical Problem

The present invention aims to provide complexes of calcium carbonate microparticles and fibers as well as techniques for efficiently preparing them.

Normally, calcium carbonate is too cohesive to dry in the dispersed state and to concentrate when it has a small primary particle size of less than 1 μm in particular less than 200 nm. For this reason, calcium carbonate microparticles were difficult to employ for various applications because they were not easy to handle even if they were synthesized in liquid.

Solution to Problem

As a result of careful studies about the problems described above, we accomplished the present invention on the basis of the finding that calcium carbonate microparticles having a small primary particle size form stable complexes with fibers by synthesizing the calcium carbonate microparticles in the presence of the fibers. Particularly according to the present invention, complexes of a calcium carbonate having a small primary particle size and a fiber can be prepared efficiently by synthesizing the calcium carbonate in the presence of the fiber while injecting a liquid into a reaction vessel. In the complexes of calcium carbonate microparticles and a fiber obtained according to the present invention, the calcium carbonate microparticles adhered to the fiber have a very uniform shape and unique properties can be conferred on the fiber. Further, the microparticles can be dehydrated/dried into a form that is easy to handle because they are adhered to the fiber.

Thus, the present invention includes, but not limited to, the following:

(1) A process for preparing a complex of calcium carbonate particles having an average primary particle size of less than 1 μm and a fiber, comprising synthesizing calcium carbonate in a solution bearing the fiber while injecting a liquid into a reaction vessel.

(2) The process as defined in (1), wherein the calcium carbonate particles have an average primary particle size of 300 nm or less.

(3) The process as defined in (1) or (2), comprising reacting an aqueous suspension of slaked lime and a gas containing carbon dioxide in the presence of cavitation bubbles.

(4) The process as defined in any one of (1) to (3), wherein the cavitation bubbles are generated by injecting a liquid into a reaction vessel.

(5) The process as defined in any one of (1) to (4), wherein the fiber is a chemical fiber, a regenerated fiber or a natural fiber.
(6) The process as defined in any one of (1) to (4), wherein the fiber is a pulp fiber.
(7) The process as defined in any one of (1) to (6), wherein the cavitation bubbles are generated by injecting an aqueous suspension of slaked lime into a reaction vessel.
(8) The process as defined in any one of (1) to (7), wherein the reaction solution circulated from the reaction vessel is used as the aqueous suspension of slaked lime.
(9) The process as defined in any one of (1) to (8), further comprising modifying the complex.
(10) A complex of calcium carbonate particles having an average primary particle size of less than 1 μm and a fiber.
(11) The complex as defined in (10), wherein the calcium carbonate particles have an average primary particle size of 200 nm or less.
(12) The complex as defined in (10) or (11), wherein the fiber is a chemical fiber, a regenerated fiber or a natural fiber.
(13) The complex as defined in (10) or (11), wherein the fiber is a pulp fiber.
(14) The complex as defined in any one of (10) to (13), wherein the weight ratio between the calcium carbonate particles and the fiber is 5:95 to 95:5.
(15) The complex as defined in any one of (10) to (14), which has been modified.
(16) A product comprising the complex as defined in any one of (10) to (15).
(17) The product as defined in any one of (10) to (15), which is a sheet
(18) The product as defined in any one of (10) to (15), which is a paper containing the complex as an internal filler.
(19) The product as defined in any one of (10) to (15), which is a paper coated with the complex as a pigment.
(20) The product as defined in any one of (10) to (15), which is a resin mixture obtained by mixing the complex and a resin.

Advantageous Effects of Invention

According to the present invention, complexes of calcium carbonate microparticles having an average primary particle size of less than 1 μm and a fiber can be prepared with good efficiency by synthesizing calcium carbonate in the presence of the fiber while injecting a liquid into a reaction vessel. Further, the resulting complexes of calcium carbonate microparticles having an average primary particle size of less than 1 μm and a fiber can be formed into sheets having a high ash retention.

The reason why complexes of calcium carbonate microparticles and a fiber can be synthesized in a short time by synthesizing calcium carbonate while injecting a liquid into a reaction vessel is not known in detail, but can be explained by the following assumption though the present invention is not bound to it. That is, it is assumed that, the dissolution/microdispersion efficiency of carbonic acid gas is improved and the reaction is activated by injecting a liquid so that calcium carbonate microparticles are prepared with good efficiency and that the calcium carbonate microparticles are deposited on the surface of a fiber serving as a carrier for calcium carbonate, whereby complexes having unique properties could be obtained. Further, it is assumed that complexes comprising calcium carbonate microparticles firmly supported on a fiber could be obtained because calcium ions were adsorbed on the surface of the fiber and penetrated into it to combine with carbonic acid gas.

DESCRIPTION OF EMBODIMENTS

Figure 1:
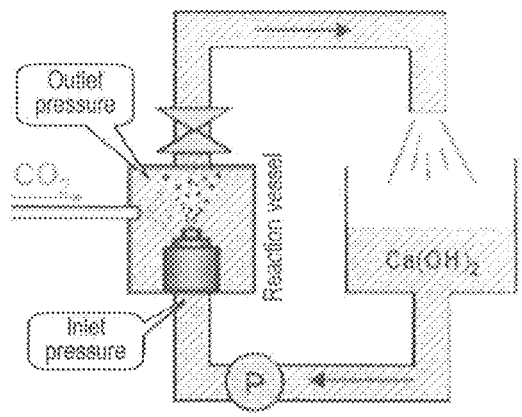
FIG. 1 is a schematic diagram showing the reaction system used in the examples of the present invention.

In the present invention, complexes of calcium carbonate microparticles and a fiber are prepared by synthesizing calcium carbonate in a solution containing the fiber while injecting a liquid into a reaction vessel.

Calcium Carbonate

The present invention makes it possible to prepare complexes of a calcium carbonate having a small average particle size and a fiber efficiently. The calcium carbonate microparticles forming part of the complexes of the present invention have an average primary particle size of less than 1 μm, and it is further possible to use calcium carbonate having an average primary particle size of less than 500 nm, or calcium carbonates having an average primary particle size of 300 nm or less, or calcium carbonates having an average particle size of 200 nm or less, or even calcium carbonates having an average particle size of 100 nm or less. On the other hand, the calcium carbonate microparticles can have an average primary particle size of 10 nm or more.

Further, the calcium carbonates obtained by the present invention may take the form of secondary particles resulting from the aggregation of fine primary particles, wherein the secondary particles can be produced to suit the purposes through an aging process or can be produced by dividing aggregates by grinding. Grinding means include ball mills, sand grinder mills, impact mills, high pressure homogenizers, low pressure homogenizers, Dyno mills, ultrasonic mills, calender roll grinders, attritors, millstone type mills, vibration mills, cutter mills, jet mills, breakers, beaters, single screw extruders, twin screw extruders, ultrasonic stirrers, juicers/mixers for home use, etc.

The complexes obtained by the present invention can be used in various shapes including, for example, powders, pellets, moldings, aqueous suspensions, pastes, sheets and other shapes. Further, the complexes can be used as main components to form molded products such as moldings and particles or pellets with other materials. The dryer used to dry the complexes to form powders is not specifically limited either, and air-flow dryers, band dryers, spray dryers and the like can be suitably used, for example.

The complexes obtained by the present invention can be used for various applications and they can be widely used for any applications including, for example, papers, fibers, cellulosic composite materials, filter materials, coating colors, plastics and other resins, rubbers, elastomers, ceramics, glasses, tires, construction materials (asphalt, asbestos, cement, boards, concrete, bricks, tiles, plywoods, fiber boards and die like), various carriers (catalyst carriers, drug carriers, agrochemical carriers, microbial carriers and the like), adsorbents (decontaminants, deodorants, dehumidifying agents and the like), anti-wrinkle agents, clay, abrasives, modifiers, repairing materials, thermal insulation materials, damp proofing materials, water repellent materials, waterproofing materials, light shielding materials, sealants, shielding materials, insect repellents, adhesives, inks, cosmetics, medical materials, paste materials and the like. They also can be used for various fillers, coating agents and the like in the applications mentioned above. Among others, the complexes of the present invention axe readily applied for papermaking purposes including, for example, printing papers, newsprint papers, inkjet printing papers, PPC papers, kraft papers, woodfree papers, coated papers, coated fine papers, wrapping papers, thin papers, colored, woodfree papers, cast-coated papers, carbonless copy papers, label papers, heat-sensitive papers, various fancy papers, water-soluble papers, release papers, process papers, hanging base papers, incombustible papers, flame retardant papers, base papers for laminated boards, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like. Thus, the present invention makes it possible to provide complexes of calcium carbonate microparticles having a small particle size and a narrow particle size distribution and a fiber so that they can exhibit different properties from those of conventional calcium carbonates having a particle size of more than 1 μm for papermaking use. Further, they can be formed into sheets in which calcium carbonate is not only more likely to retain but also uniformly dispersed without being aggregated in contrast to those in which a calcium carbonate having a small primary particle size is simply added to a fiber. The calcium carbonate here is not only adhered to the outer surface and the inside of the lumen of the fiber but also deposited within microfibrils, as shown by the results of electron microscopic observation.

Further, the calcium carbonate complexes obtained by the present invention can be used typically in combination with particles known as inorganic fillers and organic fillers or various fibers. For example, inorganic fillers include calcium carbonate (precipitated calcium carbonate, ground calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica-containing products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes formed with silica or calcium carbonate during the recycling process, etc. In addition to calcium carbonate-silica complexes such as calcium carbonate and/or precipitated calcium carbonate-silica complexes, amorphous silicas such as white carbon can also be used. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like. Fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps) and bacterial celluloses, among which wood pulps may be prepared by pulping wood raw materials. Examples of wood raw materials include softwoods such as *Pinus densiflora, Pinus thunbergii, Abies Sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machifus thunbergii, Castanopsis, Betula platyphyila, Populus nigra* var, *italica*, poplars, *Fraxinus, Populus maximowiczii, Eucalyptus*, mangroves, *Meranti, Acacia* and mixed materials thereof. The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching). Examples of non-wood pulps include cotton, hemp, sisal (*Agave sisalana*), abaca (*Musa textilis*), flax, straw, bamboo, bagas, kenaf and the like. The wood pulps and non-wood pulps may be unbeaten or beaten. Synthetic fibers include polyesters, polyamides, polyolefins, and acrylic fibers; semisynthetic fibers include rayon, acetate and the like; and inorganic fibers include glass fiber, carbon fiber, various metal fibers and the like. All these may be used alone or as a combination of two or more of them.

The average particle size or shape or the like of the calcium carbonates forming part of the complexes of the present invention can be identified by electron microscopic observation. Further, calcium carbonate microparticles having various sizes or shapes can be complexed with fibers by controlling the conditions under which calcium carbonate is synthesized.

Injection of a Liquid

In the complexes of the present invention, calcium carbonate is synthesized in the presence of a fiber while injecting a liquid into a reaction vessel. As used herein, the term "cavitation" refers to a physical phenomenon in which bubbles rapidly appear and disappear in a flowing fluid when it is subjected to a change in pressure. Bubbles generated by cavitation (cavitation bubbles) grow from very small "bubble nuclei" of 100 µm or less present in a liquid when the pressure drops below the saturated vapor pressure in the fluid only for an instant.

In the present invention, a liquid may be injected under conditions where cavitation bubbles are generated or a liquid may be injected under conditions where cavitation bubbles are not generated. Cavitation bubbles can be generated in a reaction vessel by known methods. For example, it is possible to generate cavitation bubbles by injecting a fluid under high pressure, or to generate cavitation bubbles by high speed stirring in a fluid, or to generate cavitation bubbles by causing an explosion in a fluid, or to generate cavitation bubbles with an ultrasonic vibrator (vibratory cavitation) or the like.

Particularly in the present invention, a liquid is preferably injected under pressure. In this embodiment, a liquid to be injected is compressed by using a pump or the like and injected at high speed through a nozzle or the like, whereby cavitation bubbles are generated at the same time as the liquid itself expands due to a very high shear force and a sudden pressure drop near the nozzle. Fluid jetting allows cavitation bubbles to be generated with high efficiency, whereby the cavitation bubbles have stronger collapse impact. In the present invention, the presence or absence of cavitation bubbles can be controlled by injecting a liquid during the synthesis of calcium carbonate, clearly in contrast to cavitation bubbles spontaneously occurring in fluid machinery and causing uncontrollable harms.

In the present invention, the reaction solution of a raw material or the like can be directly used as a jet liquid, or some fluid can be injected into the reaction vessel. The fluid forming a liquid jet may be any of a liquid, a gas, or a solid such as powder or pulp or a mixture thereof so far as it is flowing. Moreover, another fluid such as carbonic acid gas can be added as an additional fluid to the fluid described above, if desired. The fluid described above and the additional fluid may be injected as a homogeneous mixture or may be injected separately.

The liquid jet refers to a jet of a liquid or a fluid containing solid particles or a gas dispersed or mixed in a liquid, such as a liquid jet containing a slurry of pulp or inorganic particles and bubbles. The gas here may contain bubbles generated by cavitation.

In the present invention, calcium carbonate can be synthesized under conditions where cavitation bubbles are not generated. Specifically, the pressure of the jetting liquid (upstream pressure) is 2 MPa or less, preferably 1 MPa or less, and then the pressure of the jetting liquid (downstream pressure) is released to 0.05 MPa or less.

Alternatively in the present invention, calcium carbonate can be synthesized under conditions where cavitation bobbles occur. The flow rate and pressure are especially important for cavitation because it occurs when a liquid is accelerated and a local pressure drops below the vapor pressure of the liquid. Therefore, the cavitation number σ, which is a basic dimensionless number expressing a cavitation state, is defined as follows ("New Edition Cavitation: Basics and Recent Advance", Written and Edited by Yoji Katoh, Published by Makishoten, 1999).

[Formula 1]

$$\sigma = \frac{p_\infty - p_v}{\frac{1}{2}\rho U_\infty^2} \quad (1)$$

If the cavitation number here is high, it means that the flow site is in a state where cavitation is less likely to occur. Especially when cavitation is generated through a nozzle or an orifice tube as in the case of a cavitation jet, the cavitation number σ can be rewritten by equation (2) below where $p_1$ is the nozzle upstream pressure, $p_2$ is the nozzle downstream pressure, and $p_v$ is the saturated vapor pressure of sample water, and the cavitation number σ can be further approximated as shown by equation (2) below in a cavitation jet because the pressure difference between $p_1$, $p_2$ and $p_v$ is significant so that $p_1 \gg p_2 \gg p_v$ (H. Soyama, J. Soc. Mat. Sci. Japan, 47 (4), 381 1998).

[Formula 2]

$$\sigma = \frac{p_2 - p_v}{p_1 - p_2} \approx \frac{p_2}{p_1} \quad (2)$$

Cavitation conditions in the present invention are as follow: the cavitation number σ defined above is desirably 0.001 or more and 0.5 or less, preferably 0.003 or more and 0.2 or less, especially preferably 0.01 or more and 0.1 or less. If the cavitation number σ is less than 0.001, little benefit is attained because the pressure difference from the surroundings is small when cavitation bobbles collapse, but if it is greater than 0.5, the pressure difference in the flow is too small to generate cavitation.

When cavitation is to be generated by emitting a jetting liquid through a nozzle or an orifice tube, the pressure of the jetting liquid (upstream pressure) is desirably 0.01 MPa or more and 30 MPa or less, preferably 0.7 MPa or more and 20 MPa or less, more preferably 2 MPa or more and 15 MPa or less. If the upstream pressure is less than 0.01 MPa, little benefit is attained because a pressure difference is less likely to occur from the downstream pressure. If the upstream pressure is higher than 30 MPa, a special pump and pressure vessel are required and energy consumption increases, leading to cost disadvantages. On the other hand, the pressure in the vessel (downstream pressure) is preferably 0.05 MPa or more and 0.9 MPa or less expressed in static pressure. Further, the ratio between the pressure in the vessel and the pressure of the jetting liquid is preferably in the range of 0.001 to 0.5.

The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate cavitation. If it is greater than 200 m/sec, however, special equipment is required to generate high pressure, leading to cost disadvantages.

In the present invention, a liquid may be injected into a reaction vessel where calcium carbonate is synthesized. The process can be run in one pass, or can be run through a necessary number of cycles. Further, the process can be run in parallel or in series using multiple generating means.

Liquid injection may take place in a vessel open to the atmosphere, but preferably within a pressure vessel because cavitation is easy to control.

When cavitation is to be generated by liquid injection, the solids content of the aqueous suspension of slaked lime forming the reaction solution is preferably 30% by weight or less, more preferably 20% by weight or less. This is because cavitation bubbles are more likely to homogeneously act on the reaction system at such levels. Further, the solids content of the aqueous suspension of slaked lime forming the reaction solution is preferably 0.1% by weight or more in terms of the reaction efficiency.

In the present invention, the pH of the reaction solution is basic at the beginning of the reaction, but changes to neutral as the carbonation reaction proceeds. Thus, the reaction can be controlled by monitoring the pH of the reaction solution.

In the present invention, stronger cavitation can be generated by increasing the jetting pressure of the liquid because the flow rate of the jetting liquid increases and accordingly the pressure decreases. Moreover, a stronger impact force can be produced by increasing the pressure in the reaction vessel because the pressure in the region where cavitation bubbles collapse increases and the pressure difference between the bubbles and the surroundings increases so that the bubbles vigorously collapse. This also helps to promote the dissolution and dispersion of carbonic acid gas introduced. The reaction temperature is preferably 0° C. or more and 90° C. or less, especially preferably 10° C. or more and 60° C. or less. Given that the impact force is generally thought to be maximal at the midpoint between the melting point and the boiling point, the temperature is suitably around 50° C. in cases of aqueous solutions, though significant benefits can be obtained even at lower temperatures within the range defined above because there is no influence of vapor pressure.

In the present invention, surfactants can be added to the reaction solution. Surfactants that may be used include known or novel surfactants, e.g., nonionic surfactants, anionic surfactants, cationic surfactants and amphoteric surfactants such as tatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jelling liquid and/or target liquid.

Synthesis of Complexes of Calcium Carbonate Microparticles and a Fiber

In the present invention, calcium carbonate microparticles are synthesized in a solution containing a fiber while injecting a liquid into a reaction vessel using a known method for synthesizing calcium carbonate. For example, calcium carbonate can be synthesized by the carbonation process, soluble salt reaction, lime-soda process, Solvay process or the like, and in a preferred embodiment, calcium carbonate is synthesized by the carbonation process.

For preparing calcium carbonate by the carbonation process, lime is typically used as a calcium source to synthesize calcium carbonate through a slaking step in which water is added to quick lime CaO to give slaked lime $Ca(OH)_2$ and a carbonation step in which carbonic acid gas $CO_2$ is injected into the slaked lime to give calcium carbonate $CaCO_3$. During then, the suspension of slaked lime prepared by adding water to quick lime may be passed through a screen to remove less soluble lime particles contained in the suspension. Alternatively, slaked lime may be used directly as a calcium source. In cases where calcium carbonate is synthesized by the carbonation process in the present invention, the carbonation reaction may be performed in the presence of a fiber while injecting a liquid.

Reaction vessels typically known for preparing calcium carbonate by the carbonation process (carbonation reactors: carbonators) include gas injection carbonators and mechanically stirred carbonators. The gas injection carbonators inject carbonic acid gas into a carbonation reaction vessel containing a suspension of slaked lime (milk of lime) to react slaked lime with carbonic acid gas, but it is difficult to precisely control bubbles to have a uniform size simply by injecting carbonic acid gas, which imposes a limitation on the reaction efficiency. On the other hand, the mechanically stirred carbonators are equipped with a stirrer inside the carbonators and introduce carbonic acid gas near the stirrer, whereby carbonic acid gas forms fine bubbles to improve the efficiency of the reaction between slaked lime and carbonic acid gas ("Handbook of Cement, Gypsum and Lime" published by GIHODO SHUPPAN Co., Ltd., 1995, page 495).

If the reaction solution had a high concentration or the carbonation reaction proceeded in cases where stirring took place with a stirrer provided within a carbonation reaction vessel such as mechanically stirred carbonators, however, the resistance of the reaction solution increased to make it difficult to thoroughly stir it and therefore make it difficult to precisely control the carbonation reaction or a considerable load was applied on the stirrer for thorough stirring, thus leading to energy disadvantages. Further, a gas injection port is located at a lower site of the carbonator, and blades of the stirrer are provided near the bottom of the carbonator to allow better stirring. Less soluble lime screen residues rapidly precipitate and always stay at the bottom so that they block the gas injection port or disturb the balance of the stirrer. Moreover, conventional methods required not only a carbonator but also a stirrer and equipment for introducing carbonic acid gas into the carbonator, which also incurred much costs of equipment. In addition, the mechanically stirred carbonators improve the efficiency of the reaction between slaked lime and carbonic acid gas by dispersing carbonic acid gas supplied near the stirrer as fine bubbles with the stirrer, but they failed to disperse carbonic acid gas as sufficiently fine bubbles when the concentration of the reaction solution was high or in other cases and they also sometimes had difficulty in precisely controlling the morphology or the like of the produced calcium carbonate in the carbonation reaction. In the present invention, calcium carbonate is synthesized in the presence of a fiber while injecting a liquid, whereby the carbonation reaction proceeds efficiently and uniform calcium carbonate microparticles can be prepared. Especially, the use of a liquid jet allows thorough stirring without any mechanical stirrer such as blades. In the present invention, previously known reaction vessels can be used, including the gas injection carbonators and the mechanically stirred carbonators as described above without any problems as a matter of course, and these vessels may be combined with a jet using a nozzle or the like.

In cases where calcium carbonate is synthesized by the carbonation process, the aqueous suspension of slaked lime preferably has a solids content of 0.1 to 40% by weight, more preferably 0.5 to 30% by weight, even more preferably about 1 to 20% by weight. If the solids content is low, the reaction efficiency decreases and the production cost increases, but if the solids content is too high, the fluidity decreases and the reaction efficiency decreases. In the present invention, calcium carbonate is synthesized in the presence of a fiber while injecting a liquid so that the reaction solution and carbonic acid gas can be mixed well even if a suspension (slurry) having a high solids content is used.

The aqueous suspension containing slaked lime that can be used includes those typically used for the synthesis of calcium carbonate, and can be prepared by, for example, mixing slaked lime with water or by slaking (digesting) quick lime (calcium oxide) with water. The slaking conditions are not specifically limited, but may include, for example, a CaO concentration of 0.1% by weight or more, preferably 1% by weight or more, and a temperature of 20 to 100° C., preferably 30 to 100° C. Further, the average residence time in the slaking reaction vessel (slaker) is not specifically limited, either, but can be, for example, 5 minutes to 5 hours, preferably 2 hours or less. It should be understood that the slaker may be batch or continuous. It should be noted that the present invention may use a carbonation reaction vessel (carbonator) and a slaking reaction vessel (slaker) separately, or may use one reaction vessel serving as both carbonation reaction vessel and slaking reaction vessel.

In the present invention, water is used, for preparing the suspension or for other purposes, and the water that can be used includes common tap water, industrial water, groundwater, well water and the like, and also preferably includes ion exchanged water, distilled water, ultrapure water, industrial waste water, and water obtained during separation/dehydration of the calcium carbonate slurry issuing from the carbonation step.

Further in the present invention, the reaction solution can be circulated from the carbonation reaction vessel and used as a liquid containing calcium hydroxide. If the reaction solution is circulated, in this way to increase contacts between the reaction solution and carbonic acid gas, the reaction efficiency increases and desired calcium carbonate can be easily obtained.

In the present invention, a gas containing carbon dioxide (carbonic acid gas) is injected into a reaction vessel where it is mixed with the reaction solution. According to the present invention, the carbonation reaction can be performed with good efficiency because carbonic acid gas can be supplied to the reaction solution without any gas feeder such as a fan, blower or the like, and carbonic acid gas is finely dispersed by a liquid jet.

In the present invention, the carbon dioxide concentration, of the gas containing carbon dioxide is not specifically limited, but the carbon dioxide concentration is preferably higher. Further, the amount of carbonic acid gas introduced into the injector is not limited and can be selected as appropriate, but carbonic acid gas is preferably used at a flow rate of 100 to 10000 L/hr per kg of slaked lime, for example.

The gas containing carbon dioxide of the present invention may be substantially pare carbon dioxide gas or a mixture with another gas. For example, a gas containing an inert gas such as air or nitrogen in addition to carbon dioxide gas can be used as the gas containing carbon dioxide. Further, gases containing carbon dioxide other than carbon dioxide gas (carbonic acid gas) that can be suitably used include exhaust gases discharged from incinerators, coal boilers, heavy oil boilers and the like of papermaking factories. In addition, the carbonation reaction can also be performed using carbon dioxide generated from lime calcination processes.

For preparing the complexes of the present invention, various known auxiliaries can also be added. For example, chelating agents can be added in the carbonation reaction, specifically including polyhydroxycarboxylic acids such as citric acid, malic acid, and tartaric acid; dicarboxylic acids such as oxalic acid; sugar acids such as gluconic acid;

aminopolycarboxylic acids such as iminodiacetic acid, and ethylenediamine tetraacetic acid and alkali metal salts thereof; alkali metal, salts of polyphosphoric acids such as hexametaphosphoric acid, and tripolyphosphoric acid; amino acids such as glutamic acid and aspartic acid and alkali metal acids thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated, fatty acids such as oleic acid and linoleic acid; resin, acids such as alicyclic carboxylic acids and abietic acid as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, fused phosphoric acid and the like. Further, dispersants can also be used, if desired. Such dispersant include, for example, sodium polyacrylate, sucrose fatty acid esters, glycerin fatty acid esters, acrylic acid-maleic acid copolymer ammonium salts, methacrylic acid-naphthoxypolyethylene glycol acrylate copolymers, methacrylic acid-polyethylene glycol monomethacrylate copolymer ammonium salts, polyethylene glycol monoacrylate and the like. These can be used alone or as a combination of two or more of them. They may be added before or alter the carbonation reaction. Such additives can be added preferably in an amount of 0.001 to 20%, more preferably 0.1 to 10% of slaked lime.

Fibers

In the present invention, calcium carbonate microparticles are complexed with a fiber. The fiber forming part of the complexes is not specifically limited, and examples of fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps) and bacterial celluloses, among which wood pulps may be prepared by pulping wood raw materials. Examples of wood raw materials include softwoods such as *Pinus densiflora, Pinus thunbergii, Abies Sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabraia*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, *Fraxiuus, Populus maximowiczii, Eucalyptus*, mangroves, Meranti, *Acacia* and mixed materials thereof.

The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical, pretreatment; waste paper pulp; deinked pulp and the like. The wood pulps may have been unbleached (before bleaching) or bleached (after bleaching).

Examples of non-wood pulps include cotton, hemp, sisal (*Agave sisalana*), abaca (*Musa textilis*), flax, straw, bamboo, bagas, kenaf and the like.

The pulp fibers may be unbeaten or beaten, and may be chosen depending on the properties of the complex sheets, but they are preferably beaten. This can be expected to improve the sheet strength and to promote the adhesion of calcium carbonate.

Synthetic fibers include polyesters, polyamides, polyolefins, and acrylic fibers; semisynthetic fibers include rayon, acetate and the like; and inorganic fibers include glass fiber, carbon fiber, various metal fibers and the like.

The fibers shown above may be used alone or as a mixture of two or more of them. Especially, the complexes preferably comprise a wood pulp or a combination of a wood pulp and a non-wood pulp and/or a synthetic fiber, more preferably a wood pulp alone.

In preferred embodiments, the fiber forming part of the complexes of the present invention is a pulp fiber. Alternatively, fibrous materials collected from waste water of papermaking factories may be supplied to the carbonation reaction of the present invention, for example. Various composite particles including those of various shapes such as fibrous particles can be synthesized by supplying such materials to the reaction vessel.

Reaction Conditions

In the present invention, the conditions of the carbonation reaction are not specifically limited, and appropriately selected depending on the purposes. For example, the temperature of the carbonation reaction can be 0 to 90° C., preferably 10 to 70° C. The reaction temperature can be controlled by regulating the temperature of the reaction solution using a temperature controller, and if the temperature is low, the reaction efficiency decreases and the cost increases, but if it exceeds 90° C., coarse calcium carbonate particles tend to increase.

Further in the present invention, the carbonation reaction can be a batch reaction or a continuous reaction. Typically, the reaction is preferably performed as a batch process because of the convenience in removing residues after the carbonation reaction. The scale of the reaction is not specifically limited, and can be 100 L or less, or more than 100 L. The volume of the reaction vessel can be, for example, about 10 L to 100 L, or may be about 100 L to 1000 L.

Further, the carbonation reaction can be controlled by monitoring the pH of the reaction suspension, and the carbonation reaction can be conducted until the pH reaches less than pH9, preferably less than pH8, more preferably around pH7, for example, depending on the pH profile of the reaction solution.

Alternatively, the carbonation reaction can be controlled by monitoring the conductivity of the reaction solution. The carbonation reaction is preferably conducted until the conductivity drops to 1 mS/cm or less.

Furthermore, the carbonation reaction can also be controlled by the reaction period, and specifically it can be controlled by adjusting the period during which the reactants stay in the reaction vessel. Additionally, the reaction can also be controlled in the present invention by stirring the reaction solution in the carbonation reaction vessel or performing the carbonation reaction as a multistage reaction.

In the present invention, the reaction product complex is obtained as a suspension so that it can be stored in a storage tank or subjected to processing such as concentration, dehydration, grinding, classification, aging, or dispersion, as appropriate. These can be accomplished by known processes, which may be appropriately selected taking into account the purposes, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and Tube presses or vacuum drum filters such as Oliver filters or the like, which cars be suitably used to give a calcium carbonate cake. Grinding means include ball mills, sand grinder mills, impact mills, high pressure homogenizers, low pressure homogenizers. Dyno mills, ultrasonic mills, calender roll grinders, attritors, millstone type mills, vibration mills, cutter mills, jet mills, breakers, beaters, single screw extruders, twin screw extruders, ultrasonic stirrers, juicers/mixers for home use, etc. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

The complexes obtained by the present invention may be compounded into fillers or pigments as a suspension without being completely dehydrated, or may be dried into powder. The dryer used here is not specifically limited either, but air-flow dryers, band dryers, spray dryers and the like can be suitably used, for example.

The complexes obtained by the present invention can be modified by known methods. In an embodiment, for example, they can be hydrophobized on their surfaces to enhance the miscibility with resins or the like.

Molded Products of the Complexes

The completes or the present invention can be used to prepare molded products, as appropriate. For example, the complexes obtained by the present invention can be readily formed into sheets having a high ash content. Paper machines (sheet-forming machines) used for preparing sheets include, for example, Fourdrinier machines, cylinder machines, gap formers, hybrid formers, multilayer paper machines, known sheet-forming machines combining the papermaking methods of these machines and the like. The linear pressure in the press section of the paper machines and the linear calendering pressure in a subsequent optional calendering process can be both selected within a range convenient for the runnability and the performance of the complex sheets. Further, the sheets thus formed may be impregnated or coated with starches, various polymers, pigments and mixtures thereof.

During sheet forming, wet and/or dry strength additives (paper strength additives) can be added. This allows the strength of the complex sheets to be improved. Strength additives include, for example, resins such as urea-formaldehyde resins, melamine-formaldehyde resins, polyamides, polyamines, epichlorohydrin resins, vegetable gums, latexes, polyethylene imines, glyoxal, gums, mannogalactan polyethylene imines, polyacrylamide resins, polyvinylamines, and polyvinyl alcohols; composite polymers or copolymers composed of two or more members selected from the resins listed above; starches and processed starches; carboxymethylcellulose, guar gum, urea resins and the like. The amount of the strength additives to be added is not specifically limited.

Further, high molecular weight polymers or inorganic materials can be added to promote the adhesion of fillers to fibers or to improve the retention of fillers or fibers. For example, coagulants can be added, including cationic polymers such as polyethylene imines and modified polyethylene imines containing a tertiary and/or quaternary ammonium group, polyalkylene imines, dicyandiamide polymers, polyamines, polyamine/epichlorohydrin polymers, polymers of dialkyldiallyl quaternary ammonium monomers, dialkylaminoalkyl acrylates, dialkylaminoalkyl methacrylates, dialkylaminoalkyl acrylamides and dialkylaminoalkyl methacrylamides with acrylamides, monoamine/epihalohydrin polymers, polyvinyl amines and polymers containing a vinylamine moiety as well as mixtures thereof; cation-rich zwitterionic polymers containing an anionic group such as a carboxyl or sulfone group copolymerized in the molecules of the polymers listed above; mixtures of a cationic polymer and an anionic or zwitterionic polymer and the like. Cationic or anionic or zwitterionic polyacrylamide-based materials can be used as retention aids. These may be applied as retention systems called dual polymer in combination with at least one or more cationic or anionic polymers or may be applied as multicomponent retention systems in combination with at least one or more anionic inorganic microparticles such as bentonite, colloidal silica, polysilicic acid, microgels of polysilicic acid or polysilicic acid salts and aluminum-modified products thereof or one or more organic microparticles having a particle size of 100 μm or less called micropolymers composed, of crosslinked/polymerized acrylamides. Especially when the polyacrylamide-based materials used alone or in combination with other materials have a weight-average molecular weight of 2,000,000 Da or more, preferably 5,000,000 Da or more as determined by intrinsic viscosity measurement, good retention can be achieved, and when the acrylamide-based materials have a molecular weight of 10,000,000 Da or more and less than 30,000,000 Da, very high retention can be achieved. The polyacrylamide-based materials may be emulsions or solutions. Specific compositions of such materials are not specifically limited so far as they contain an acrylamide monomer unit as a structural unit in them, but include, for example, copolymers of a quaternary ammonium salt of an acrylate ester and an acrylamide, or ammonium salts obtained by copolymerizing an acrylamide and an acrylate ester and then quaternarizing the copolymer. The cationic charge density of the cationic polyacrylamide-based materials is not specifically limited.

Other additives include freeness improvers, internal sizing agents, pH modifiers, antifoaming agents, pitch control agents, slime control agents, bulking agents, inorganic particles (the so-called fillers) such as calcium carbonate, kaolin, talc and silica and the like depending on the purposes. The amount of these additives to be used is not specifically limited.

Molding techniques other than sheet forming may also be used, and molded products having various shapes can be obtained by the so-called pulp molding process involving casting a raw material into a mold and then dehydrating/drying it by suction or the process involving spreading a raw material over the surface of a molded product of a resin or metal or the like and drying it, and then releasing the dried, material from the substrate or other processes. Further, the complexes can be molded like plastics by mixing them with resins, or can be molded like ceramics by calcining them with minerals such as silica or alumina. In the compounding/drying/molding steps shown above, only one complex can be used, or a mixture of two or more complexes can be used. Two or more complexes can be used as a premixture of them or can be mixed after they have been individually compounded, dried and molded.

Further, various organic materials such as polymers or various inorganic materials such as pigments may be added later to molded products of the complexes.

EXAMPLES

The following examples further illustrate the present invention, but the present invention is not limited to these examples. Unless otherwise specified, the concentrations, parts and the like as used herein are based on weight, and the numerical ranges are described to include their endpoints.

Experiment 1: Synthesis of Complexes of Calcium Carbonate Microparticles and Fibers <Synthesis of Complexes of Calcium Carbonate Microparticles and Fibers>
An aqueous suspension containing calcium hydroxide (slaked lime $Ca(OH)_2$ from Wako Pure Chemical Industries, Ltd., 2% by weight) and a fiber (0.5%) was provided. 9.5 L of this aqueous suspension poured into a 45 L reservoir tank and then the suspension and carbon dioxide was injected into the reaction vessel to synthesize a complex of calcium carbonate microparticles and the fiber by the carbonation process. The reaction temperance was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

During the synthesis of the complex, the reaction solution was circulated and injected into the reaction vessel, as shown in FIG. 1. Specifically, the reaction solution was injected into the pressure vessel through a nozzle (nozzle diameter: 1.5 mm) at an injection rate of about 70 m/s under an inlet pressure (upstream pressure) of 7 MPa (Experiments 1-1 to 1-4) or 1 MPa (Experiment 1-5) and an outlet pressure (downstream pressure) of 0.3 MPa (Experiments 2-1 to 2-4) or 0.05 MPa (Experiment 1-5). It should be noted that cavitation bubbles occurred in the reaction vessel in Experiments 1-1 to 1-4 because the injection pressure was high, while cavitation bubbles did not occur in the reaction vessel in Experiment 1-5 because the injection pressure was low (no CV).

Figure 2:
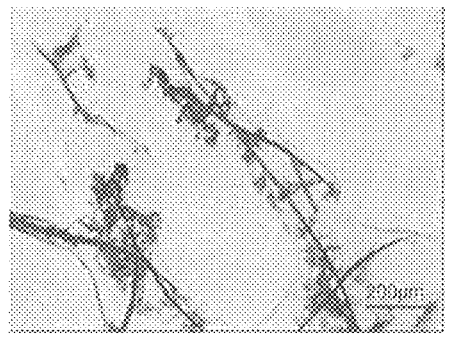
FIG. 2 is an electron micrograph of the hardwood pulp fiber having a microfibrillated surface (CV-treated pulp) used in Experiment 1 (magnification: 200×).
Figure 3:
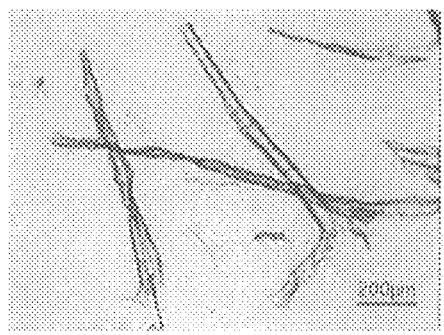
FIG. 3 is an electron micrograph of the cellulose nanofiber used in Experiment 1 (magnification: 200×).

<Fibers Forming Complexes with Calcium Carbonate>
In this experiment, the following four types of fibers were used to form complexes with calcium carbonate microparticles. Details of each fiber are shown below.
(Experiment 1-1) A hardwood pulp fiber having a microfibrillated surface (CV-treated pulp, FIG. 2);
(Experiment 1-2) A cellulose nanofiber (TEMPO-oxidized pulp, FIG. 3);
(Experiment 1-3) A thermomechanical pulp (TMP);
(Experiment 1-4) A hemp pulp fiber having a microfibrillated surface;
(Experiment 1-5) A hardwood pulp fiber (LBKP).

(Hardwood pulp fiber having a microfibrillated surface) An LBKP having a Canadian standard freeness (CSF) of about 400 mL was broken in water to prepare a pulp suspension (consistency: 0.5%). A reaction vessel was charged with this pulp suspension, and a jet flow was introduced into the reaction vessel, thereby generating cavitation bubbles. The cavitation bubbles were generated by injecting the reaction solution under high pressure through a nozzle (nozzle diameter: 1.5 mm). The injection rate was about 70 m/s, and the inlet pressure (upstream pressure) was 7 MPa and the outlet pressure (downstream pressure) was 0.3 MPa. This cavitation treatment was performed for about 1 hour until the CSF of the LBKP reached less than 100 mL.

The pulp thus obtained contained microfibrils peeled off in layers on the fiber surface and had an average fiber length of 0.69 mm as determined by a fiber tester (Lorentzen & Wettre).

(Cellulose nanofiber) An NBKP oxidized with an N-oxyl compound was beaten with a Niagara beater for about 15 minutes until the CSF reached less than 100 ml, to give a cellulose nanofiber. The resulting fiber had an average fiber length of 0.84 mm.

(Thermomechanical pulp) A thermomechanical pulp (TMP) beaten until the CSF reached about 400 mL.

(Hemp pulp fiber having a microfibrillated surface) A hemp pulp was subjected to a CV treatment in the same manner as described for the hardwood pulp fiber until the CSF decreased to less than 100 mL to give a hemp pulp having a microfibrillated surface.

TABLE 1

|  |  | CV treated pulp | TEMPO oxidized pulp |
|---|---|---|---|
| Average fiber length (length-weighted) | mm | 0.69 | 0.84 |
| Average fiber width (length-weighted) | μm | 18.0 | 35.0 |
| Fine (length-weighted) | % | 8.2 | 12.3 |
| Curl | % | 6.8 | 9.2 |

Figure 4:
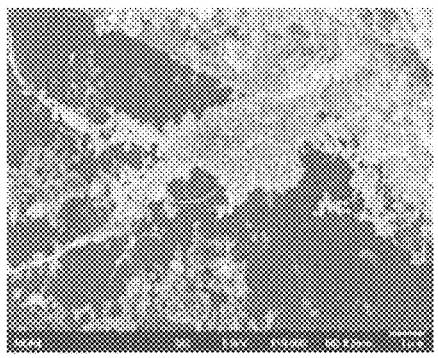
FIG. 4 is an electron micrograph of a complex of calcium carbonate microparticles and a fiber (CV-treated pulp) synthesized in Experiment 1 (magnification: left 10000×, right 50000×).
Figure 4:
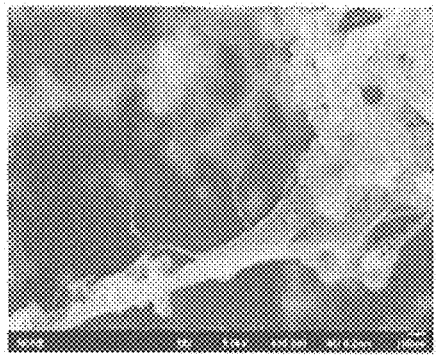

<Observation of the Complexes Obtained>
Electron micrographs of the complexes obtained are shown in FIGS. 4 to 8. FIG. 4 is an electron micrograph of a complex of a hardwood pulp fiber treated by cavitation and calcium carbonate microparticles. As shown in the figure, many calcium carbonate microparticles were deposited on the fiber surface of this complex and the calcium carbonate had a primary particle size of about 40 to 100 nm (average: about 80 nm). Especially, fibril parts of the pulp fiber were rich in calcium carbonate microparticles.

Figure 5:
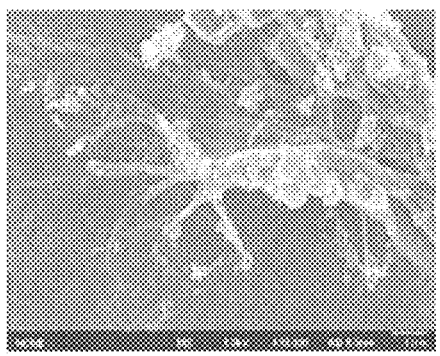
FIG. 5 is an electron micrograph of a complex of calcium carbonate microparticles and a fiber (cellulose nanofiber: CNF) synthesized in Experiment 1 (magnification: left 10000×, right 50000×).
Figure 5:
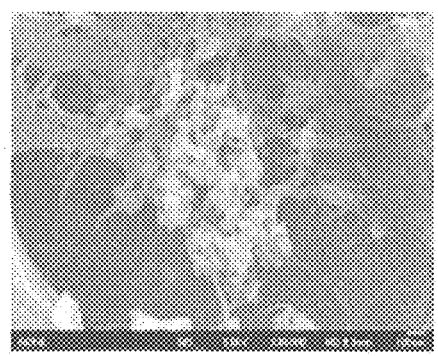
Figure 6:
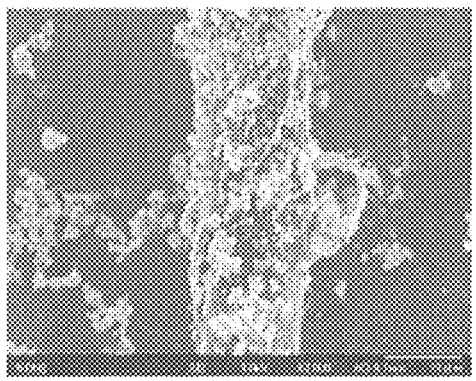
FIG. 6 is an electron micrograph of a complex of calcium carbonate microparticles and a fiber (TMP) synthesized in Experiment 1 (magnification: 2000×).
Figure 7:
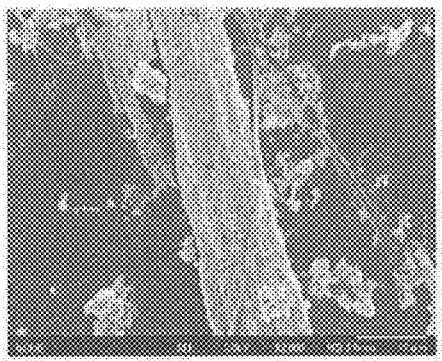
FIG. 7 is an electron micrograph of a complex of calcium carbonate microparticles and a fiber (CV-treated hemp pulp) synthesized in Experiment 1 (magnification: 2000×).
Figure 8:
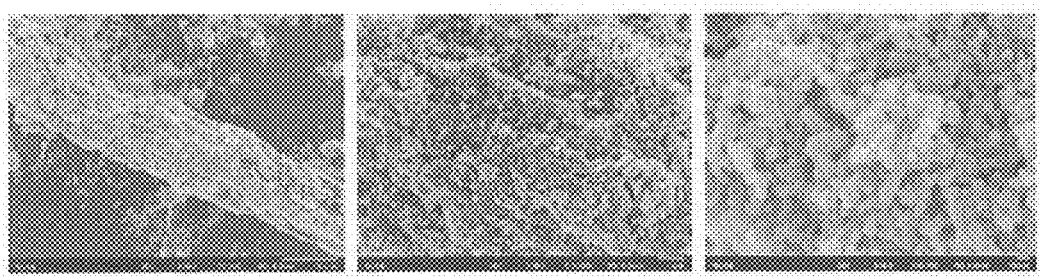
FIG. 8 is an electron micrograph of a complex of calcium carbonate microparticles and a fiber synthesized in Experiment 1 (synthesized without CV) (magnification: from left 2000×, 10000×, 50000×).
Figure 9:
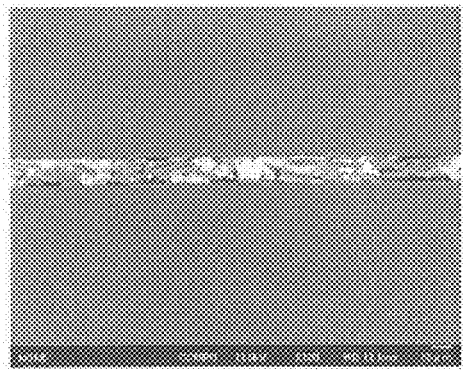
FIG. 9 is a photograph of a cross section of sheet #1 in Experiment 2 (magnification: left 500×, right 5000×).
Figure 9:
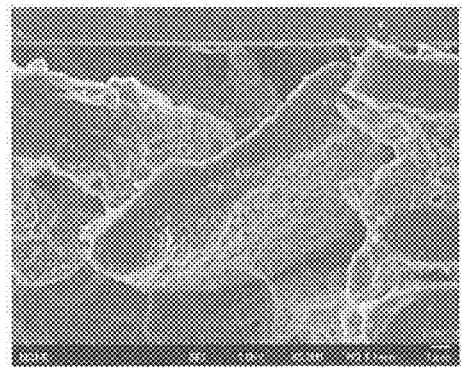
Figure 10:
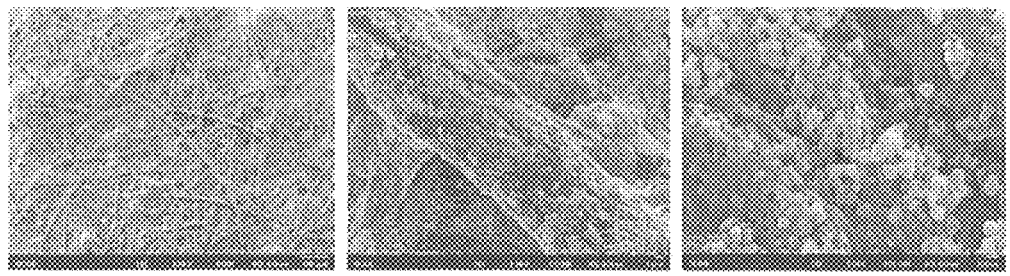
FIG. 10 is a photograph of the surface of sheet #4 in Experiment 2 (magnification: from left 100×, 3000×, 50000×).
Figure 11:
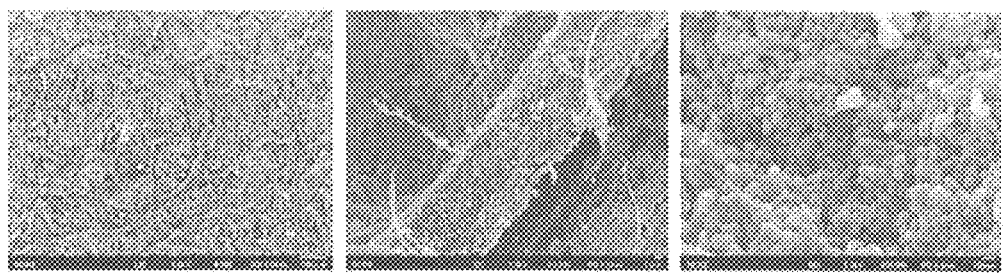
FIG. 11 is a photograph of the surface of sheet #5 in Experiment 2 (magnification: from left 100×3000×, 50000×).
Figure 12:
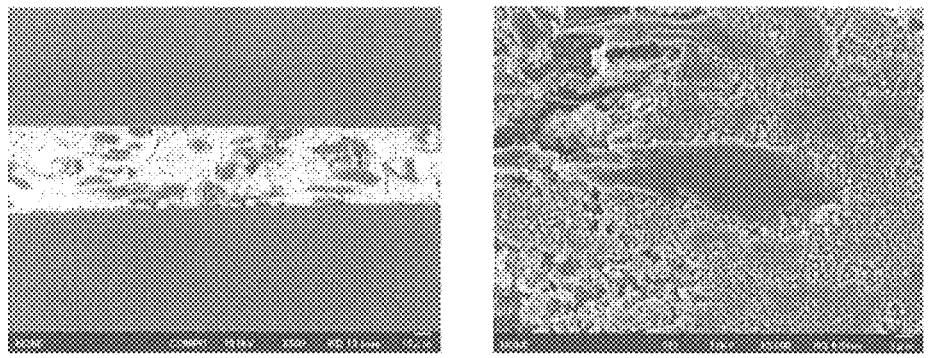
FIG. 12 is a photograph of a cross section of sheet #6 in Experiment 2 (magnification: left 500×, right 5000×).
Figure 13:
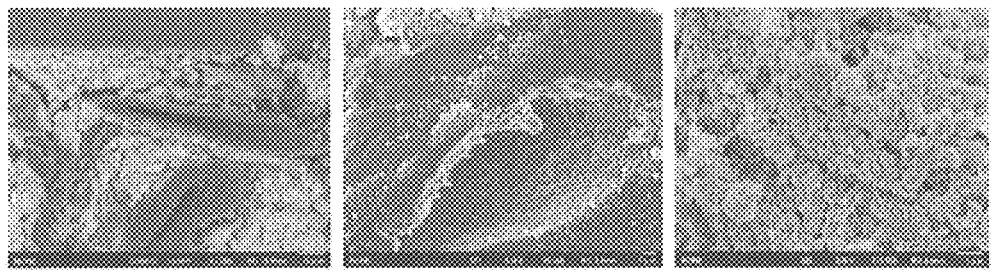
FIG. 13 is a sectional view of sheet #7 in Experiment 2 (magnification: from left 1000×, 5000×, 10000×).
Figure 14:
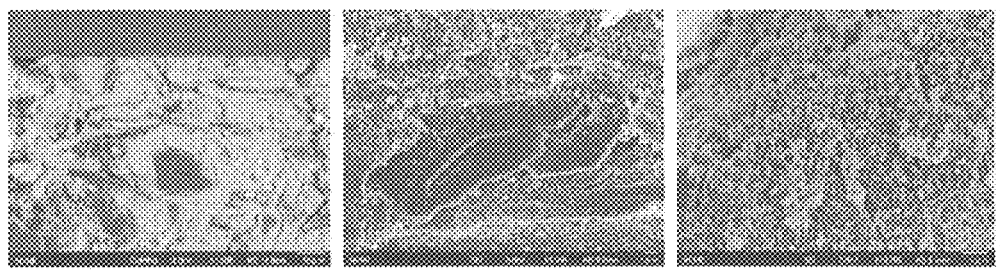
FIG. 14 is a sectional view of sheet #8 in Experiment 2 (magnification: from left 1000×, 5000×, 10000×).

FIG. 5 is an electron micrograph of a complex of a TEMPO-oxidized pulp and calcium carbonate microparticles. Similarly in this complex, many calcium carbonate microparticles were deposited on the fiber surface, and the calcium carbonate microparticles had a primary particle size of about 40 to 100 nm (average: about 80 nm). Also in this complex, fibril parts of the pulp fiber were rich in calcium carbonate microparticles.

When a TMP was used (FIG. 6) and when a hemp pulp was used (FIG. 7), calcium carbonate having a primary particle size of 40 to 80 nm were also observed to cover the fiber surface and spontaneously attach to it.

The reaction solutions containing the complexes were filtered through a filter paper under suction and observed to show that the complexes of fibers and calcium carbonate microparticles stably existed and that the calcium carbonate microparticles did not drop from the fibers.

When an LBKP was used under conditions where no cavitation occurs (FIG. 8), composite particles could also be synthesized in which calcium carbonate microparticles having an average primary particle size of about 50 to 70 nm adhered to the fiber surface.

Further, the ash contents of these complexes were determined to be 81 to 82% by weight of the complexes, which coincided with the theoretical value 82% by weight calculated from the initial ratio of the raw materials (pulp and calcium hydroxide). As used herein, the ash content of a complex was calculated from the ratio between the weight of ash remaining after the complex was heated at 525° C. for about 2 hours and the original solids content (JIS P 8251: 2003).

Experiment 2: Preparation and Evaluation of Complex Sheets

The complexes prepared in Experiment 1 (the CY-treated pulp/calcium carbonate complex, TMP/calcium carbonate complex, and hemp pulp/calcium, carbonate complex) were formed into sheets by the following procedure. A slurry of each complex (about 0.5%) was stirred with 100 ppm of a cationic retention aid (ND300 from HYMO CORPORATION) and 100 ppm of an anionic retention aid (FA230 from HYMO CORPORATION) at 500 rpm to prepare a suspension. A complex sheet having a basis weight of about 15 to 150 g/m$^2$ was prepared from the resulting suspension according to JIS P 8222, and calendered at 65 kgf/cm in a laboratory chilled calender.

The properties of the resulting sheets are shown in Table 2 below. Images taken during observation by electron microscopy (SEM) are shown in FIGS. 9 to 14. Sheets having a high ash content of 70% or more could be readily prepared by using the complexes. Further, the results of observation of a cross section of the sheets showed that fine calcium carbonate particles on the order of several tens of nanometers were produced not only on the surface of pulp fibers but also inside of lumen of fiber as well as on the inside of microfibrils.

Sheet #4 having a high basis weight exhibited an ash content of about 73% despite the fact that any chemicals such as retention aids were not added. Further, laboratory sheet #4 and sheet #5 having a basis weight of 100 g/m$^2$ or more showed high ash retention of 50% or more despite the fact that any retention aids were not added. The results of SEM observation of the surface and a cross section of each sheet showed that fine calcium carbonate particles having a primary particle size on the order of several tens of nanometers almost completely covered the pulp fiber surface in all sheets.

Experiment 3: Synthesis of Complexes of Calcium Carbonate Microparticles and Fibers (Part 2)

Complexes were synthesized according to the present invention under various conditions, and photographed with an electron microscope.

Figure 15:
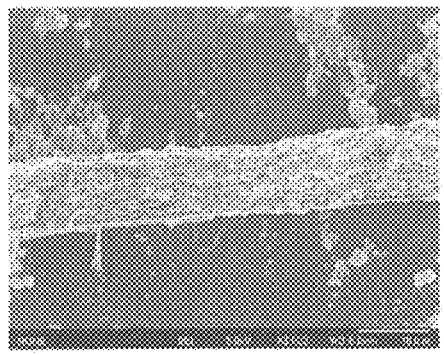
FIG. 15 is an electron micrograph of Experiment 3-1 (Sample C0) (magnification: 2000×).

Experiment 3-1: Sample C0, FIG. 15

A complex was synthesized in the same manner as in Experiment 1 except that a hardwood bleached kraft pulp (LBKP, CSF: 460 mL, without cavitation treatment) was used as a fiber. The results of electron microscopic observation showed that calcium carbonate having a primary particle size of 40 to 100 nm spontaneously adhered to the fiber surface. The ash content was 83%, which was approximately equivalent to the theoretical value (84%) calculated from the initial amount.

Figure 16:
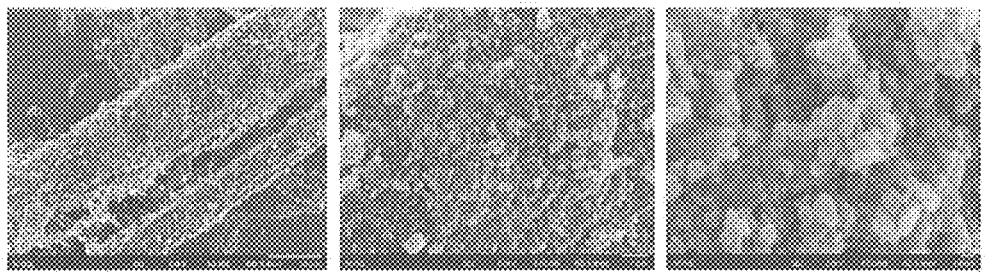
FIG. 16 is an electron micrograph of Experiment 3-2 (Sample C1) (magnification: from left 2000×, 10000×, 50000×).

Experiment 3-2: Sample C1, FIG. 16

A complex was synthesized in the same manner as in Experiment 1 except that 1250 g of LBKP (CSF: 460 mL, without cavitation treatment) was used as a fiber, 1250 g of calcium hydroxide was used and the total amount of the aqueous suspension of Ca(OH)$_2$ was 100 L. The results of electron microscopic observation showed that calcium carbonate having a primary particle size of 60 to 90 nm covered the fiber surface and spontaneously adhered to it. The ash content was determined to be 56%, which was approximately equivalent to the theoretical value (58%).

Figure 17:
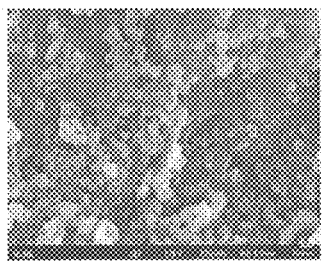
FIG. 17 is an electron micrograph of Experiment 3-3 (Sample C2) (magnification: 50000×).

Experiment 3-3: Sample C2, FIG. 17

A complex was synthesized in the same manner as in Experiment 1 except that 8300 g of a mixed pulp of LBKP/NBKP (weight ratio: 8/2, CSF: 50 ml, without cavitation treatment) was used as a fiber, 8300 g of calcium hydroxide was used, the total amount of the aqueous suspension of Ca (OH)$_2$ was 415 L, the carbon dioxide flow rate was 40 L/min, and the reaction start temperature was 16° C. The results of electron microscopic observation showed that calcium carbonate having a primary particle size of 60 to 90 nm covered the fiber surface and spontaneously adhered to it. The ash content was determined to be 56%, which was approximately equivalent to the theoretical value (58%).

Figure 18:
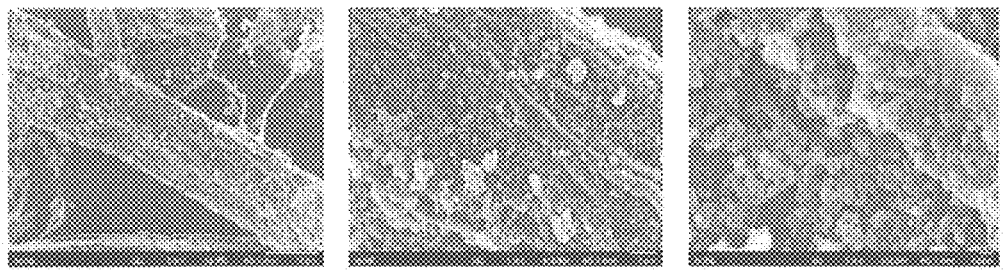
FIG. 18 is an electron micrograph of Experiment 3-4 (Sample C3) (magnification: from left 2000×, 10000×, 50000×).

Experiment 3-4: Sample C3, FIG. 18

A complex was synthesized in the same manner as in Experiment 1 except that the initial level of calcium, hydrox-

TABLE 2

| | | Sheet properties | | | | | | | |
|---|---|---|---|---|---|---|---|---|---|
| | | # | | | | | | | |
| | | 1 | 2 | 3 | 4 | 5 | 6 | 7 | 8 |
| Pulp used for the complex | | CV-treated pulp complex | | | | | | TMP | Hemp |
| Chemical additive | | No additive | | | | | Retention aids | | |
| Cationic retention aid | ppm | | | | | 100 | 200 | 200 | 200 |
| Anionic retention aid | ppm | | | | | 100 | 200 | 200 | 200 |
| Basis weight | g/m$^2$ | 14.5 | 42.4 | 107.8 | 146.6 | 39.6 | 46.6 | 58.2 | 59.1 |
| Thickness | μm | 25 | 45 | 91 | 118 | 41 | 45 | 71 | 62 |
| Density | g/cm$^3$ | 0.58 | 0.94 | 1.18 | 1.24 | 0.96 | 1.04 | 0.82 | 0.95 |
| Ash content | % | 38.7 | 57.7 | 70.7 | 72.9 | 73.5 | 76.9 | 73.1 | 87.6 |
| Opacity | % | 44.5 | 71.5 | 87.2 | 90.9 | 65.0 | 68.3 | 80.9 | 72.4 |
| Stock retention | % | 24.2 | 35.3 | 59.9 | 61.1 | 66.0 | 77.7 | — | — |
| Ash retention | % | 11.7 | 25.5 | 52.9 | 55.7 | 60.6 | 74.7 | — | — | ide was 0.74% and that the carbon dioxide flow rate was 5 L/min. The results of electron microscopic observation showed that calcium carbonate having a primary particle size of 30 to 80 nm covered the fiber surface and spontaneously adhered to it. The ash content was determined to be 48%, which was approximately equivalent to the theoretical value (50%).

Figure 19:
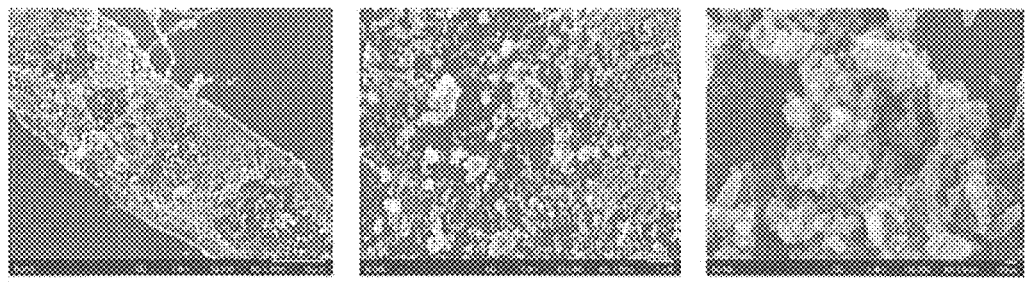
FIG. 19 is an electron micrograph of Experiment 3-5 (Sample C4) (magnification: from left 2000×, 10000×, 50000×).

Experiment 3-5: Sample C4, FIG. 19

Figure 20:
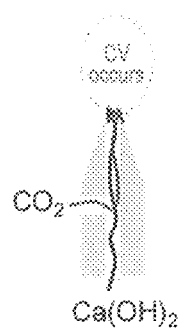
FIG. 20 is a schematic diagram showing the twin-fluid nozzle used in Experiment 3.
Figure 21:
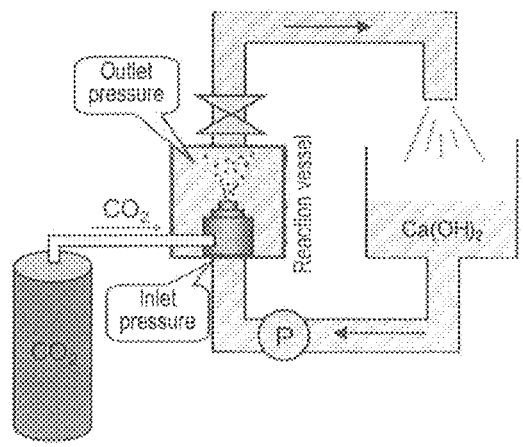
FIG. 21 is a schematic diagram showing the reaction system used in Experiment 3.

Synthesis was performed in the same manner as described for Sample C3 except that the cavitation nozzle used was changed to a twin-fluid nozzle (in which a calcium hydroxide suspension is mixed with carbon dioxide gas immediately before it is discharged from the nozzle; see FIG. 20) and carbon dioxide gas was introduced through the twin-fluid nozzle. A schematic diagram of the system is shown in FIG. 21. The results of electron microscopic observation showed that calcium carbonate having a primary particle size of 30 to 80 nm covered the fiber surface and spontaneously adhered to it. The ash content was determined to be 48%, which was approximately equivalent to the theoretical value (50%).

Figure 22:
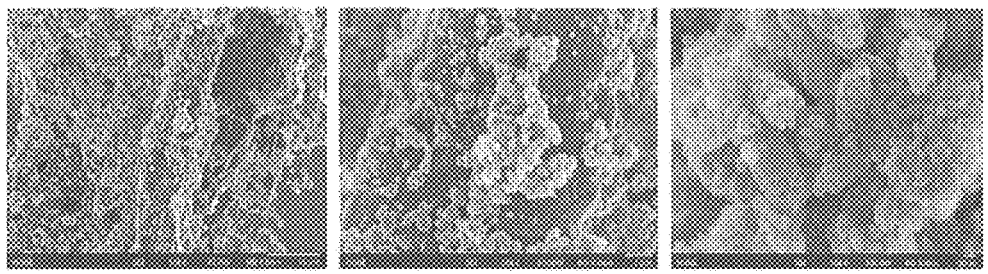
FIG. 22 is an electron micrograph of Experiment 3-6 (Sample C5) (magnification: from left 2000×, 10000×, 50000×).

Experiment 3-6: Sample C5, FIG. 22

Synthesis was performed, in the same manner as described for Sample C4 except that the raw material used was quick lime. The results of electron microscopic observation showed that calcium carbonate having a primary particle size of 40 to 80 nm covered the fiber surface and spontaneously adhered to it.

Figure 23:
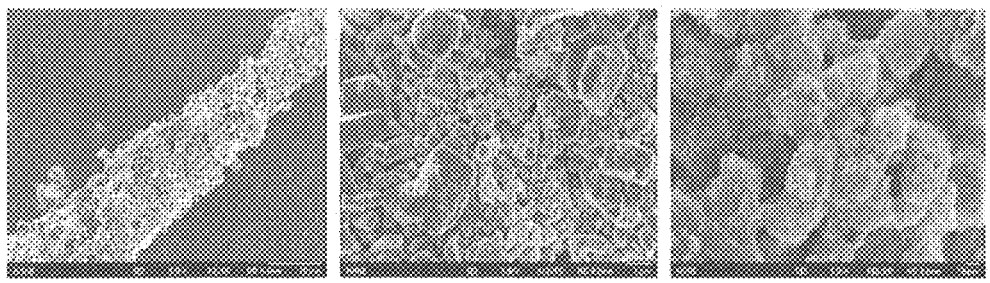
FIG. 23 is an electron micrograph of Experiment 3-7 (Sample C6) (magnification: from left 2000×, 10000×, 50000×).

Experiment 3-7: Sample C6, FIG. 23

A mixture of 280 g of calcium hydroxide and 70 g of a pulp (LBKP, CSF: about 460 mL) was diluted to 14 L with tap water. After 400 g of sodium silicate (about 30% as $SiO_2$) was added, the mixture was thrown into the reaction vessel. Use subsequent procedures and reaction conditions were the same as those of Experiment 1 except that the reaction was stopped when the pH reached about 6.7. The results of electron microscopic observation showed that particles having a primary particle size of about 20 to 50 nm supposed to be silica were deposited on the surface of calcium carbonate. Further, Sample C6 was analyzed for the abundance ratio between silica ($SiO_2$) and calcium carbonate ($CaCO_3$) by X-ray fluorescence (Table 3) to show that both silica and calcium carbonate existed.

Figure 24:
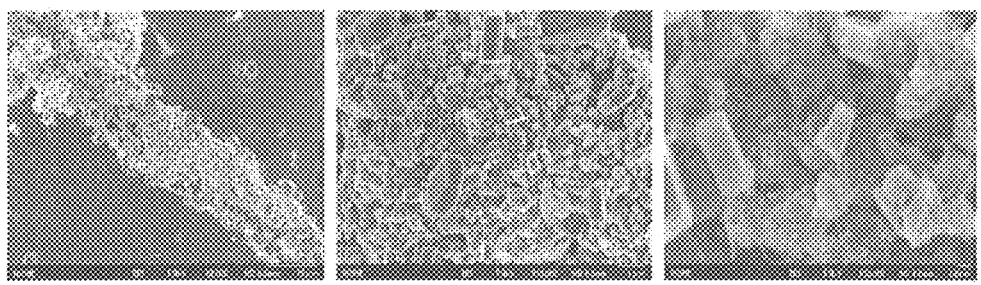
FIG. 24 is an electron micrograph of Experiment 3-8 (Sample C7) (magnification: from left 2000×, 10000×, 50000×).

Experiment 3-8: Sample C7, FIG. 24

An aqueous aluminum sulfate solution (0.8% as alumina) was added to Sample C6 thus synthesized until pH reached 6.2. The results of electron microscopic observation showed, that particles having a primary particle size of about 20 to 50 nm supposed to be silica were deposited on the surface of calcium carbonate.

Figure 25:
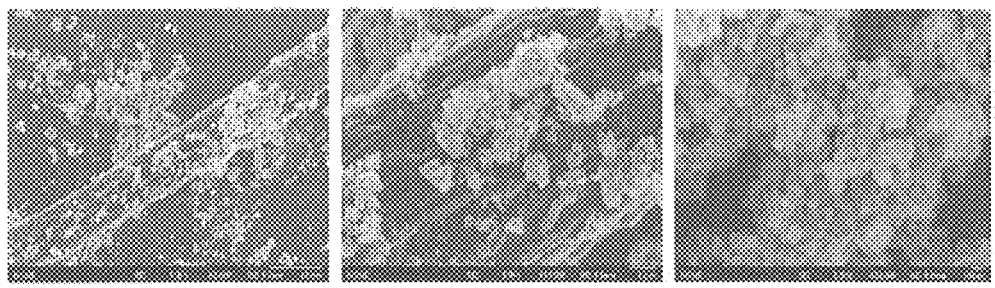
FIG. 25 is an electron micrograph of Experiment 3-9 (Sample C8) (magnification: from left 2000×, 10000×, 50000×).

Experiment 3-9: Sample C8, FIG. 25

To 1 kg of the complex of Sample C0 was added 29 g of sodium silicate (about 30% as $SiO_2$), and, the mixture was stirred with a laboratory mixer, and 41 g of an aqueous sulfuric acid solution (10%) was added to synthesize a complex. The results of electron microscopic observation showed that calcium carbonate having a primary particle size of about 80 nm existed with silica having a similar size. Analysis of the abundance ratio between silica ($SiO_2$) and calcium carbonate ($CaCO_3$) by X-ray fluorescence (Table 3) showed that both silica and calcium carbonate existed.

TABLE 3

| X-ray fluorescence analysis | | | |
|---|---|---|---|
| Sample C6 | | Sample C8 | |
| $SiO_2$ | $CaCO_3$ | $SiO_2$ | $CaCO_3$ |
| 16.8 | 83.2 | 16.3 | 83.7 |

Figure 26:
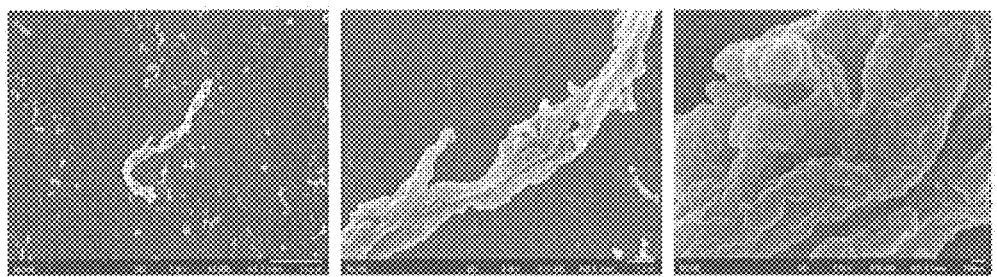
FIG. 26 is an electron micrograph of Experiment 3-11 (Sample C10) (magnification: from left 2000×, 10000×, 50000×).

Experiment 3-11: Sample C10, FIG. 26

A complex of a calcium carbonate and a fiber was synthesized in the same manner as in Experiment 1 except that the chemical fiber polyvinyl alcohol fiber (PVA fiber available from KURARAY as FIBRIBOND) was used. The results of electron microscopic observation showed that calcium carbonate having a primary particle size of 30 to 80 nm covered the fiber surface and spontaneously adhered to it. The ash content was determined to show that the calcium, carbonate level was 83%, which was equivalent to the theoretical value (84%) calculated from the initial amount.

Figure 27:
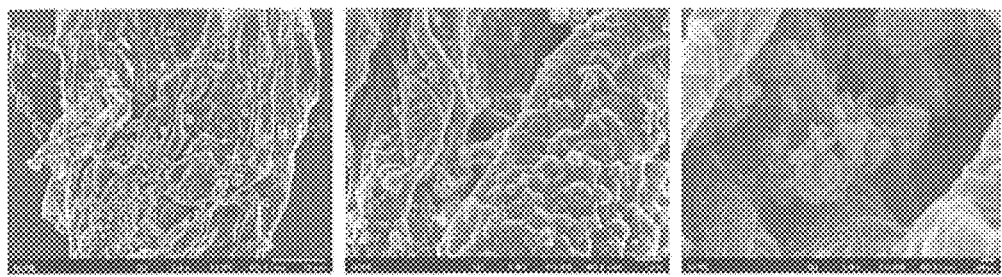
FIG. 27 is an electron micrograph of Experiment 3-12 (Sample C11) (magnification: from left 2000×, 10000×, 50000×).

Experiment 3-12: Sample C11, FIG. 27

A complex of calcium carbonate microparticles and a fiber was synthesized in the same manner as described for Sample C2 except that the chemical fiber polyolefin (SWP E-400 from DuPont Teijin Films limited) was used and the initial concentration of the fiber was 0.25%. The results of electron microscopic observation showed that calcium carbonate having a primary particle size of 30 to 80 nm covered the fiber surface and spontaneously adhered to it. The ash content was determined to show that the calcium carbonate level was 84%, which was equivalent to the theoretical value (84%) calculated from the initial amount.

Figure 28:
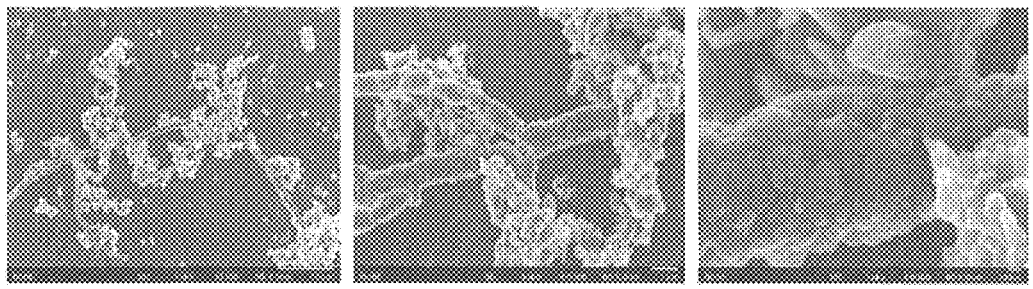
FIG. 28 is an electron micrograph of Experiment 3-13 (Sample C12) (magnification: from, left 2000×, 10000×, 50000×).

Experiment 3-13: Sample C12, FIG. 28

A complex of calcium carbonate microparticles and a fiber was synthesized in the same manner as described for Sample C2 except that the regenerated fiber lyocell (TENCEL from LENZING) was used and the initial concentration of the fiber was 0.1%. The results of electron microscopic observation showed that calcium carbonate having a primary particle size of 30 to 80 nm covered the fiber surface and spontaneously adhered to it. The ash content was determined to show that the calcium carbonate level was 91%, which was equivalent to the theoretical value (93%) calculated from the initial amount.

Experiment 4: Modification of Complexes of Calcium Carbonate Microparticles and Fibers (Hydrophobization)

An experiment for modifying the surface of the TEMPO-oxidized pulp complex of Experiment 1 and the complex of Experiment 3-1 (Sample C0) was performed. To 2 L of a slurry of each complex (consistency 2.8%) was added 1.7 g of sodium oleate dissolved in hot water (30 mL) at 90° C., and the mixture was stirred with a laboratory mixer for 5 minutes.

After the reaction, the slurry was spread over a cover glass and dried, and then the contact angle was measured using a dynamic contact angle tester (1100DAT from Fibro System AB) at 0.1 second after a water drop was placed. It should be noted that the complex of Experiment 3-1 (Sample C0) was also analyzed for the contact angle after the residue retained on a 150-mesh filter has been formed into a sheet.

As shown in the table below, the contact angle was 0° before sodium oleate was added, but 120° or more after it was added. Thus, it was confirmed that the complexes were hydrophobized by adding the oleate.

TABLE 4

| Before or after adding an oleate | C0 (on glass) | | C0 (retained on 150 mesh) | | TEMPO (on glass) | |
|---|---|---|---|---|---|---|
| | Before | After | Before | After | Before | After |
| Contact angle (°) | 0 | 148 | 0 | 126 | 0 | 148 |

Experiment 4: Preparation of Papery Containing Complexes as Fillers (Paper Products Containing Complexes Papers were prepared by adding various materials shown below as internal fillers and analyzed for their properties.
(Fillers)
(1) The CV-treated pulp/calcium carbonate complex prepared, in Experiment 1
(2) Precipitated calcium carbonate microparticles (average particle size: about 100 nm)
(3) A precipitated calcium carbonate (average particle size: about 3.5 μm)

The calcium carbonate microparticles shown above in (2) were synthesized as follows. A 45-L cavitation system was charged with 9.5 L of a 15% aqueous suspension of calcium hydroxide (slaked lime Ca $(OH)_2$ from Wako Pure Chemical Industries, Ltd.), and carbonic acid gas was injected into the reaction vessel to synthesize calcium carbonate particles by the carbonation process. The reaction temperature was about 25° C., the carbonic acid gas injection flow rate was 12 L/min, and the reaction was stopped when the pH of the reaction solution reached about 7 (from the pH of about 12.8 before the reaction). During the synthesis of calcium carbonate, cavitation bubbles were generated by circulating the reaction solution and injecting it into the reaction vessel, as shown in FIG. 1. Specifically, cavitation bubbles were generated by injecting the reaction solution under high pressure through a nozzle (nozzle diameter: 1.5 mm) at an injection rate of about 70 m/s under an inlet pressure (upstream pressure) of 7 MPa and an outlet pressure (downstream, pressure) of 0.3 MPa. Analysis of the resulting calcium carbonate microparticles showed that they had a BET specific surface area of 31.6 $m^2/g$ and an oil absorption of 126 ml/100 g. The measurement of oil absorption was performed according to the method defined in JIS K5101.

(Preparation of Papers)

A pulp slurry obtained by breaking an LBKP (CSF: about 400 mL) was mixed with various fillers in such a ratio that the resulting sheet had an ash content of 20 to 50%, and the mixture was stirred with 100 ppm of a cationic retention aid (ND300 from HYMO CORPORATION) and 100 ppm of an anionic retention aid (FA230 from HYMO CORPORATION) at 500 rpm to prepare a paper stock.

Laboratory sheet having a basis weight of about 62 $g/m^2$ were prepared from the resulting paper stock according to JIS P 8222, and calendered at 65 kgf/cm in a laboratory chilled calender.

The laboratory sheets thus obtained were evaluated for the following parameters:
Basis weight: JIS P 8124: 1998
Thickness: JIS P 8118: 1998
Density: calculated from the measured thickness and basis weight
Ash content: JIS P 8251: 2003
Brightness: JIS P 8212: 1998
Opacity: JIS P 8149: 2000
Air resistance: JIS P8117: 2009
Smoothness: JIS P 8155: 2010.

The results are shown in the table below, indicating that the papers containing the calcium, carbonate/pulp complex (1) undergo less content-dependent change in opacity than those containing the calcium carbonate microparticles (2) or the precipitated calcium carbonate (3) and that they had an opacity nearly equivalent to the value of the paper consisting of the LBKP alone even when the ash content was increased to 50%.

Further, the air resistance increased when the content of (1) was increased as compared with (2) and (3). In addition, the ash retention was higher by approximately 10 points or more in the papers containing (1) and (2) than those containing (3).

TABLE 5

| | | Test No. | | | | | | | |
|---|---|---|---|---|---|---|---|---|---|
| | | 1 | 2 | 3 | 4 | 5 | 6 | 7 | 8 |
| Ash content | | 0% | | 20% | | 30% | | 50% | |
| Filler | | None | PCC | CVCC | Complex | CVCC | PCC | CVCC | Complex |
| Basis weight | $g/m^2$ | 63.7 | 64.2 | 63.8 | 64.0 | 62.3 | 59.9 | 61.4 | 61.9 |
| Thickness | μm | 114 | 120 | 112 | 108 | 106 | 118 | 101 | 93 |
| Density | $g/cm^3$ | 0.56 | 0.53 | 0.57 | 0.59 | 0.59 | 0.51 | 0.61 | 0.67 |
| Ash content | % | 0.3 | 20.2 | 19.2 | 20.7 | 29.3 | 47.9 | 48.7 | 50.2 |
| Brightness | % | 85.0 | 88.8 | 87.8 | 87.0 | 88.9 | 91.6 | 90.7 | 89.4 |
| Opacity | % | 76.6 | 86.7 | 83.4 | 78.4 | 85.1 | 90.8 | 87.4 | 78.2 |
| Thickness (after calendering) | μm | 84.5 | 78.0 | 75.8 | 75.3 | 69.3 | 65.0 | 61.5 | 61.5 |
| Density (after calendering) | $g/cm^3$ | 0.76 | 0.83 | 0.84 | 0.85 | 0.90 | 0.92 | 1.00 | 1.01 |
| Brightness (after calendering) | % | 82.2 | 86.4 | 84.7 | 83.9 | 85.2 | 89.0 | 85.7 | 85.1 |
| Opacity (after calendering) | % | 76.6 | 86.1 | 81.2 | 78.0 | 81.6 | 89.8 | 80.7 | 76.0 |
| S value | m2/kg | 39.2 | 71.0 | 57.1 | 43.7 | 65.1 | 108.4 | 78.2 | 45.6 |
| Air resistance | sec | 6 | 4 | 10 | 13 | 14 | 4 | 30 | 67 |
| Smoothness | sec | 6 | 8 | 8 | 6 | 10 | 9 | 14 | 7 |
| Ash retention (approximation) | % | — | 47.7 | 85.2 | 78.4 | 83.6 | 64.5 | 74.0 | 80.3 |

Experiment 5: Preparation and Evaluation of Complex Sheets (Part 2)

Experiment 5-1

Complex sheets were prepared by hand making in the same manner as in Experiment 2 using the complexes of Samples C11 and C12. Complex sheets were also prepared by using C1 in combination with C11 and C12. However, the chemicals used were a coagulant (Catiofast SF from BASF added at 600 ppm based on the total solids), a cationic retention aid (ND300 from HYMO CORPORATION added at 100 ppm based on the total solids), and an anionic retention aid (FA230 from HYMO CORPORATION added at 100 ppm based on the total solids).

Figure 29:
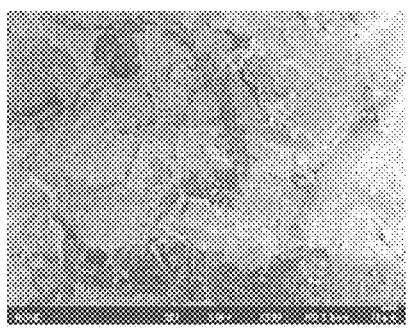
FIG. 29 is an electron micrograph, of a complex sheet prepared from C11 (Experiment 5-1, magnification: 500×).
Figure 30:
FIG. 30 is an electron micrograph, of a complex sheet prepared from C12 (Experiment 5-1, magnification: 500×).

Complex sheets could be prepared by using any complexes. Electron micrographs of the sheets prepared from C11 and C12 are shown in FIGS. 29 and 30 respectively, proving that complex sheets of a chemical fiber and a calcium carbonate having an ash content of 79% or more could be prepared.

TABLE 6

| | | Sample # | | | |
|---|---|---|---|---|---|
| | | C11 Polyolefin complex (without calendering) | C12 Lyocell complex (without calendering) | C11 + C1 Polyolefin complex + LBKP complex (calendered) | C12 + C1 Lyocell complex + LBKP complex (calendered) |
| Basis weight | g/m² | 277 | 135 | 214 | 240 |
| Thickness | μm | 367 | 208 | 198 | 221 |
| Density | g/cm³ | 0.75 | 0.65 | 1.08 | 1.09 |
| Ash content | % | 85.5 | 79.7 | 61.6 | 66.5 |
| Brightness | % | 96.0 | 94.0 | 90.4 | 90.4 |
| Opacity | % | 98.9 | 92.6 | 96.9 | 97.3 |
| Air resistance | sec | 687 | 1 | 773 | 498 |
| Smoothness | sec | 1 | 2 | 209 | 206 |

* Thickness was measured at 100 kPa.

Experiment 5-2

Complex sheets were prepared by hand making in the same manner as in Experiment 2 using the complexes C0 and C1. The complex C0 was also used to prepare a sheet containing 5% or 10% of a cellulose nanofiber (CNF: obtained by breaking a TEMPO-oxidized pulp) based on the total solids, and a sheet containing 25% or 10% of a PVA fiber. Further, control sheets were prepared from an LBKP (CSF=460 mL) and a precipitated calcium carbonate (scalenohedral type, particle size=3.6 μm).

The results are shown in the table below. The sheets obtained from the complexes had higher strength than the sheets with equivalent ash contents containing a precipitated calcium carbonate as an internal additive. Moreover, the sheets containing a CNF had very high air resistance and greatly improved breaking length and specific tear strength.

<CNF or PVA Added>

TABLE 7

| | | Sample # | | | | | | | |
|---|---|---|---|---|---|---|---|---|---|
| | | C0 | C1 | CNF added | | PVA fiber added | | GCC internal additive | |
| | | LBKP complex 1 | LBKP complex 2 | C0+ 10 parts CNF | C0+ 5 parts CNF | C0+ 25 parts PVA | C0+ 10 parts PVA | LBKP+ GCC | LBKP+ GCC |
| Basis weight | g/m² | 227 | 238 | 249 | 268 | 206 | 241 | 252 | 262 |
| Thickness | μm | 311 | 319 | 253 | 287 | 288 | 333 | 412 | 471 |
| Ash content | % | 81.0 | 54.7 | 48.6 | 51.9 | 65.9 | 74.6 | 79.1 | 52.5 |
| Brightness | % | 89.4 | 89.0 | 87.5 | 88.4 | 89.7 | 88.8 | 96.4 | 93.2 |
| Opacity | % | 92.9 | 96.7 | 94.5 | 96.3 | 92.5 | 94.2 | 99.3 | 99.2 |
| S value | m²/kg | 29.2 | 45.5 | 31.1 | 37.5 | 31.6 | 31.0 | 143.2 | 108.2 |
| Air resistance | sec | 1648 | 457 | 68096 | 14757 | 1302 | 1832 | 161 | 78 |
| Smoothness | sec | 952 | 210 | 14 | 22 | 99 | 343 | 389 | 152 |
| PPS roughness | μm | 1.4 | 3.3 | 7.9 | 9.2 | 2.6 | 3.5 | 2.2 | 2.7 |
| Taber bending stiffness | mN.m | 1.5 | 1.8 | 1.9 | 2.0 | 1.1 | 1.4 | 0.7 | 1.3 |
| Breaking length | km | 0.36 | 0.86 | 2.17 | 1.69 | 0.73 | 0.51 | 0.12 | 0.56 |
| Specific tear strength | mN(g/m²) | 0.51 | 1.14 | 4.37 | 3.67 | 1.85 | 1.04 | 0.18 | 0.48 |

Experiment 5-3

Complex sheets were prepared by hand making in the same manner as in Experiment 2 using the complexes C6 to C8.

Figure 31:
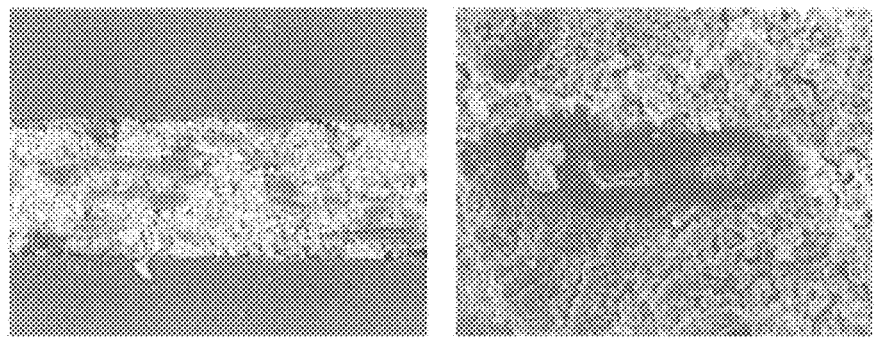
FIG. 31 is a photograph of a cross section of a complex sheet prepared from C6 (Experiment 5-3, magnification: from left 500×, 5000×).
Figure 32:
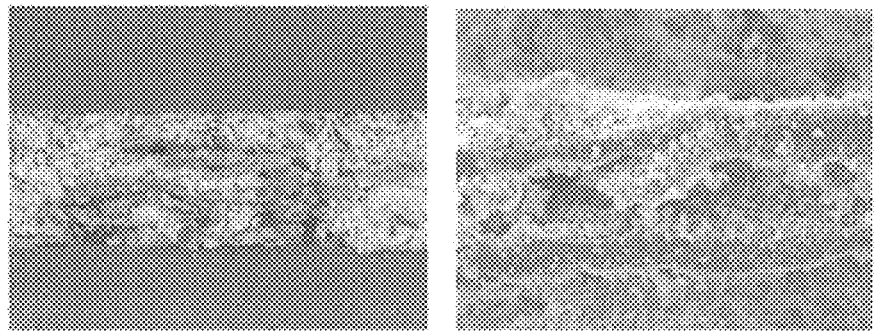
FIG. 32 is a photograph of a cross section of a complex sheet prepared from C8 (Experiment 5-3, magnification: from left 500×, 5000×).

The results are shown in the table below and FIGS. 31 and 32. The results of electron microscopic observation of a cross section of the sheets showed that calcium carbonate and silica were also deposited on the inside of the pulp fibers.

TABLE 8

|  |  |  | Sample # | | |
|---|---|---|---|---|---|
|  |  |  | C6 Silica pre-added | C7 Silica added (with alumina) | C8 Silica post-added |
| Without calendering | Basis weight | g/m² | 62.0 | 71.1 | 62.6 |
|  | Ash content | % | 68.2 | 70.3 | 58.3 |
|  | Thickness | μm | 130 | 153 | 132 |
|  | Density | g/cm³ | 0.48 | 0.46 | 0.48 |
|  | Opacity | % | 89.1 | 87.9 | 89.0 |
| After calendering | Thickness | μm | 72 | 85 | 68 |
|  | Density | g/cm³ | 0.86 | 0.84 | 0.92 |
|  | Opacity | % | 90.6 | 90.3 | 83.1 |

* Thickness was measured at 50 kPa.

Experiment 6: Preparation and Evaluation of Complex Sheets (Part 3)

Experiment 6-1

Complex sheets were prepared using a paper machine. Specifically, Sample C2 and a mixed pulp of LBKP/NBKP (weight ratio: 8/2, CSF: 50 ml) were made into sheets by a Fourdrinier machine. During then, an amphoteric retention aid (KYESLOC PR-AM7 from KYOWA SANGYO CO., LTD.) was added at 200 ppm based on the total solids. The use of the complex as a raw material made it possible to prepare a sheet having an ash content of about 53% by a paper machine and to continuously take up the resulting sheet in a roll. Further, the resulting complex sheet showed better formation as well as higher smoothness and air resistance as compared with the sheet consisting of the pulp alone.

Experiment 6-2

A complex was synthesized in the same manner as described for C2 except that LBKP (CSF=400 ml, 4000 g) and calcium hydroxide (12400 g) were used and that the total amount of the aqueous suspension was 400 ml, thereby giving Sample X. Sample X and LBKP (CSF: 400 ml) were made into sheets by a Fourdrinier machine. During then, 100 ppm of an anionic retention aid (FA230 from HYMO CORPORATION) and 100 ppm of a cationic retention aid (ND300 from HYMO CORPORATION) were added. The use of the complex as a raw material made it possible to prepare a sheet having an ash content of about 69% by a paper machine and to continuously take up the resulting sheet in a roll.

\<Papermaking\>

TABLE 9

| | | | Test No. | | | | |
|---|---|---|---|---|---|---|---|
| | | | Experiment 6-1 | | | Experiment 6-2 | |
| | | | 1 KP | 2 KP/complex | 3 Complex | 1 KP/complex | 2 Complex |
| Complex | Calcium carbonate | % |  | 25 | 50 | 72 | 80 |
|  | LBKP | % |  | 20 | 40 | 18 | 20 |
|  | NBKP | % |  | 5 | 10 |  |  |
| L/NBKP (mixture) | L:N = 8:2 | % | 100 | 50 |  |  |  |
| NBKP |  | % |  |  |  | 10 |  |
| Basis weight |  | g/m² | 61.9 | 98.7 | 69.1 | 58.8 | 61.7 |
| Thickness |  | μm | 84 | 118 | 84 | 79 | 81 |
| Ash content |  | % | 0.4 | 28.1 | 52.8 | 54.9 | 68.6 |
| Formation index |  | — | — | 6.5 | 5.2 | 4.0 | 5.3 | 5.0 |
| Brightness | F face | % | 84.0 | 86.8 | 89.6 | 91.9 | 92.3 |
|  | W face | % | 84.0 | 86.5 | 89.3 | 91.7 | 92.1 |
| Opacity |  | % | 64.5 | 88.0 | 84.1 | 91.8 | 94.9 |
| Air resistance |  | sec | 709 | 1,387 | 1,045 | 28 | 41 |
| Smoothness | F face | sec | 10 | 8 | 20 | 35 | 36 |
|  | W face | sec | 5 | 4 | 6 | 14 | 9 |
| PPS roughness | F face | μm | 8.4 | 8.7 | 6.6 | 5.3 | 4.5 |
|  | W face | μm | 10.3 | 11.4 | 9.3 | 6.3 | 6.8 |
| Bending stiffness | MD | μN·m | 132 | 57 | 60 | 47 | 16 |
| (corrected for basis weight) | CD | μN·m | 69 | 37 | 25 | 18 | 9 |
| Specific tear strength | MD | mN(g/m2) | 6.1 | 4.8 | 2.6 | 3.0 | 0.9 |
|  | CD | mN(g/m2) | 5.8 | 4.6 | 2.4 | 3.5 | 1.1 |
| Breaking length | MD | km | 9.1 | 4.8 | 2.8 | 1.3 | 0.5 |
|  | CD | km | 5.9 | 2.1 | 1.3 | 0.9 | 0.4 |
| Elongation | MD | mm | 2.7 | 1.8 | 1.2 | 0.8 | 0.7 |
|  | CD | mm | 7.4 | 6.4 | 5.3 | 2.3 | 1.8 |

Experiment 7: Preparation of Products Comprising Calcium Carbonate/Fiber Complexes (Kneaded Resins)

Calcium carbonate and a calcium carbonate/fiber complex were added as fillers to a resin to prepare kneaded resins. The resin used was polypropylene (PP available from Prime Polymer Co., Ltd. as J105G), and 6.2 kg of the resin was combined with 3 kg of each filler in dry weight and 0.8 g of a compatibilizing agent (UMEX 1010 from Sanyo Chemical Industries, Ltd.). During then, ion exchanged water was added to adjust the solids content to 50%. After thorough mixing, the mixture was molten/kneaded in a twin screw kneader while evaporating water to prepare complex pellets.

Then, the pellets were molded into dumbbell-shaped pieces by an injection molding machine to measure the strength and the like of the kneaded resins. All of the properties of the kneaded resins were determined according to JIS K7161.

<Fillers>

The samples shown below were stirred with 3% of sodium oleate based on the total solids dissolved in hot water (50 mL) at 90° C. using a laboratory mixer for 5 minutes to hydrophobize the surface of each sample. In the present experiment, the fillers thus hydrophobized were used.

Precipitated calcium carbonate microparticles (average particle size: about 100 nm, described in Experiment 4 above)

Precipitated calcium carbonate (particle size 3.5 µm)

A precipitated calcium carbonate/fiber complex (synthesized in Experiment 1-2)

Precipitated, calcium carbonate and cellulose nanofiber (separately added)

Cellulose nanofiber (described in Experiment 1 above).

The results are shown in the table below. As shown in the table, elongation at break could be increased by adding calcium carbonate microparticles of the present invention as fillers.

TABLE 10

|  | Blank (no filler) | #1 | #2 | #3 | #4 |
|---|---|---|---|---|---|
| Precipitated calcium carbonate microparticles (average particle size: about 100 nm) |  | 30 |  |  |  |
| Calcium carbonate (particle size 3.5 µm) |  |  | 30 |  | 20 |
| Cellulose nanofiber (CNF) |  |  |  |  | 10 |
| Precipitated calcium carbonate/CNF complex |  |  |  | 30 |  |
| Tensile yield stress | 32.0 | 31.4 | 35.0 | 34.1 | 34.9 |
| Tensile elasticity | 1.2 | 1.8 | 1.9 | 1.8 | 1.9 |
| Tensile elongation at break | 11 | 2.8 | 3.6 | 4.9 | 4.2 |

The invention claimed is:

1. A process for preparing a complex of calcium carbonate particles having an average primary particle size of less than 1 µm and a fiber, comprising
    synthesizing calcium carbonate by injecting under pressure a liquid into a reaction solution bearing the fiber in a reaction vessel, wherein the liquid comprises an aqueous suspension of slaked lime and the calcium carbonate is synthesized by a reaction of the aqueous suspension of slaked lime with a gas containing carbon dioxide,
    wherein the liquid is injected in the range of between 1 m/sec and 200 m/sec,
    wherein the calcium carbonate particles are deposited on the surface of the fiber in the complex, and wherein the reaction vessel is a pressure vessel, and the pressure in the vessel is from 0.05 MPa to 0.9 MPa,
    wherein the pressure of the injecting liquid is from 0.01 MPa to 30 MPa.

2. The process of claim 1, wherein the calcium carbonate particles have an average primary particle size of 300 nm or less.

3. The process of claim 1, comprising synthesizing calcium carbonate in the presence of cavitation bubbles.

4. The process of claim 3, wherein the cavitation bubbles are generated by injecting a liquid into a reaction vessel.

5. The process of claim 1, wherein the fiber is a synthetic fiber, a regenerated fiber or a natural fiber.

6. The process of claim 1, wherein the fiber is a cellulosic fiber.

7. The process of claim 3, wherein the cavitation bubbles are generated by injecting an aqueous suspension of slaked lime into a reaction vessel.

8. The process of claim 1, wherein the reaction solution is circulated from the reaction vessel.

9. The process of claim 1, further comprising modifying the complex so that surfaces of the complex are hydrophobized.

10. The process of claim 1, wherein the fiber comprises a cellulosic fiber having a Canadian standard freeness (CSF) of at least 50 ml.

11. The process of claim 1, wherein the fiber has an average fiber length of at least 0.69 mm.

12. The process of claim 1, wherein the pressure in the vessel is from 0.3 MPa to 0.9 MPa.

13. The process of claim 1, wherein the ratio between the pressure in the vessel and the pressure of the injecting liquid is from 0.001 to 0.5.

* * * * *